US012581446B2

(12) United States Patent
Ramezan et al.

(10) Patent No.: US 12,581,446 B2
(45) Date of Patent: Mar. 17, 2026

(54) REGISTRATION METHODS USING ONE-TIME IDENTIFIERS FOR USER EQUIPMENTS AND NODES IMPLEMENTING THE REGISTRATION METHODS

(71) Applicant: HUAWEI TECHNOLOGIES CO., LTD., Shenzhen (CN)

(72) Inventors: Gholamreza Ramezan, Kanata (CA); Bingyang Liu, Shenzhen (CN); Weiyu Jiang, Shenzhen (CN); Fei Yang, Shenzhen (CN); Amr Adel Nasr Abdelnasser, Vancouver (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 511 days.

(21) Appl. No.: 18/306,532

(22) Filed: Apr. 25, 2023

(65) Prior Publication Data

US 2023/0269690 A1     Aug. 24, 2023

Related U.S. Application Data

(63) Continuation of application No. PCT/CN2020/138381, filed on Dec. 22, 2020.

(51) Int. Cl.
*H04W 60/00* (2009.01)
*H04W 12/041* (2021.01)
*H04W 12/75* (2021.01)

(52) U.S. Cl.
CPC ......... *H04W 60/00* (2013.01); *H04W 12/041* (2021.01); *H04W 12/75* (2021.01)

(58) Field of Classification Search
CPC .............. H04W 12/06; H04W 12/041; H04W 12/75; H04W 12/04
See application file for complete search history.

(56) References Cited

U.S. PATENT DOCUMENTS

| | | | | |
|---|---|---|---|---|
| 2014/0006786 A1* | 1/2014 | Campagna | ............ | H04W 12/04 713/171 |
| 2020/0389865 A1* | 12/2020 | Kunz | ...................... | H04W 8/12 |

(Continued)

FOREIGN PATENT DOCUMENTS

| | | |
|---|---|---|
| CN | 110858968 A | 3/2020 |
| CN | 111327583 A | 6/2020 |
| WO | 2020036883 A1 | 2/2020 |

OTHER PUBLICATIONS

S3-171783, Ericsson et al, 5G-GUTI—requirements on UE/AMF and security procedures (affects clauses 5.1, 5.3, and 6.8.2), 3GPP TSG SA WG3 (Security) Meeting #88, Aug. 7-11, 2017, Dali, China, total 2 pages.

(Continued)

*Primary Examiner* — Margaret G Webb
(74) *Attorney, Agent, or Firm* — BCF LLP

(57) ABSTRACT

A user equipment (UE) uses a one-time identifier to identify itself in a registration request sent to a trusted core network (CN) node. The one-time identifier is in the form of a first temporary identifier. The trusted CN node registers the UE, generates a next temporary identifier, and sends a random challenge to the UE. The UE uses the random challenge to generate a copy of the next temporary identifier and stores the next temporary identifier in a memory. Then, until a next registration, the UE and the trusted CN node use the first temporary identifier to identify the UE when communicating with each other and with other trusted and untrusted CN nodes. In the next registration event, the UE uses the next temporary identifier to identity itself to the trusted CN node. A true identity of the UE is not detectable by an untrusted node that may become compromised.

20 Claims, 21 Drawing Sheets

(56)     References Cited

U.S. PATENT DOCUMENTS

| | | | |
|---|---|---|---|
| 2022/0060325 A1* | 2/2022 | Castellanos Zamora ................... H04W 12/40 | |
| 2023/0231851 A1* | 7/2023 | Kunz ................... H04W 60/06 455/411 | |
| 2024/0022908 A1* | 1/2024 | Baskaran ............ H04W 12/069 | |

OTHER PUBLICATIONS

International Search Report and Written Opinion issued in corresponding International application No. PCT/CN2020/138381 on Sep. 13, 2021.

* cited by examiner

| Message # | $OTI_{ACK}$ bits | | | | | | | | Successful reception of | | |
| --- | --- | --- | --- | --- | --- | --- | --- | --- | --- | --- | --- |
| | 1 | 2 | 3 | 4 | 5 | 6 | 7 | 8 | $TSUPI_{N+1}$ | $TGPSI_{N+1}$ | $TPEI_{N+1}$ |
| 1 | 1 | 0 | 0 | 1 | 0 | 1 | 1 | 0 | ✗ | ✗ | ✗ |
| 2 | 0 | 1 | 0 | 1 | 0 | 1 | 1 | 0 | ✗ | ✗ | ✓ |
| 3 | 1 | 1 | 0 | 1 | 0 | 1 | 1 | 0 | ✗ | ✓ | ✗ |
| 4 | 0 | 0 | 1 | 1 | 0 | 1 | 1 | 0 | ✗ | ✓ | ✓ |
| 5 | 1 | 0 | 1 | 1 | 0 | 1 | 1 | 0 | ✓ | ✗ | ✗ |
| 6 | 0 | 1 | 1 | 1 | 0 | 1 | 1 | 0 | ✓ | ✗ | ✓ |
| 7 | 1 | 1 | 1 | 1 | 0 | 1 | 1 | 0 | ✓ | ✓ | ✗ |
| 8 | 0 | 0 | 0 | 0 | 1 | 1 | 1 | 0 | ✓ | ✓ | ✓ |

Figure 6

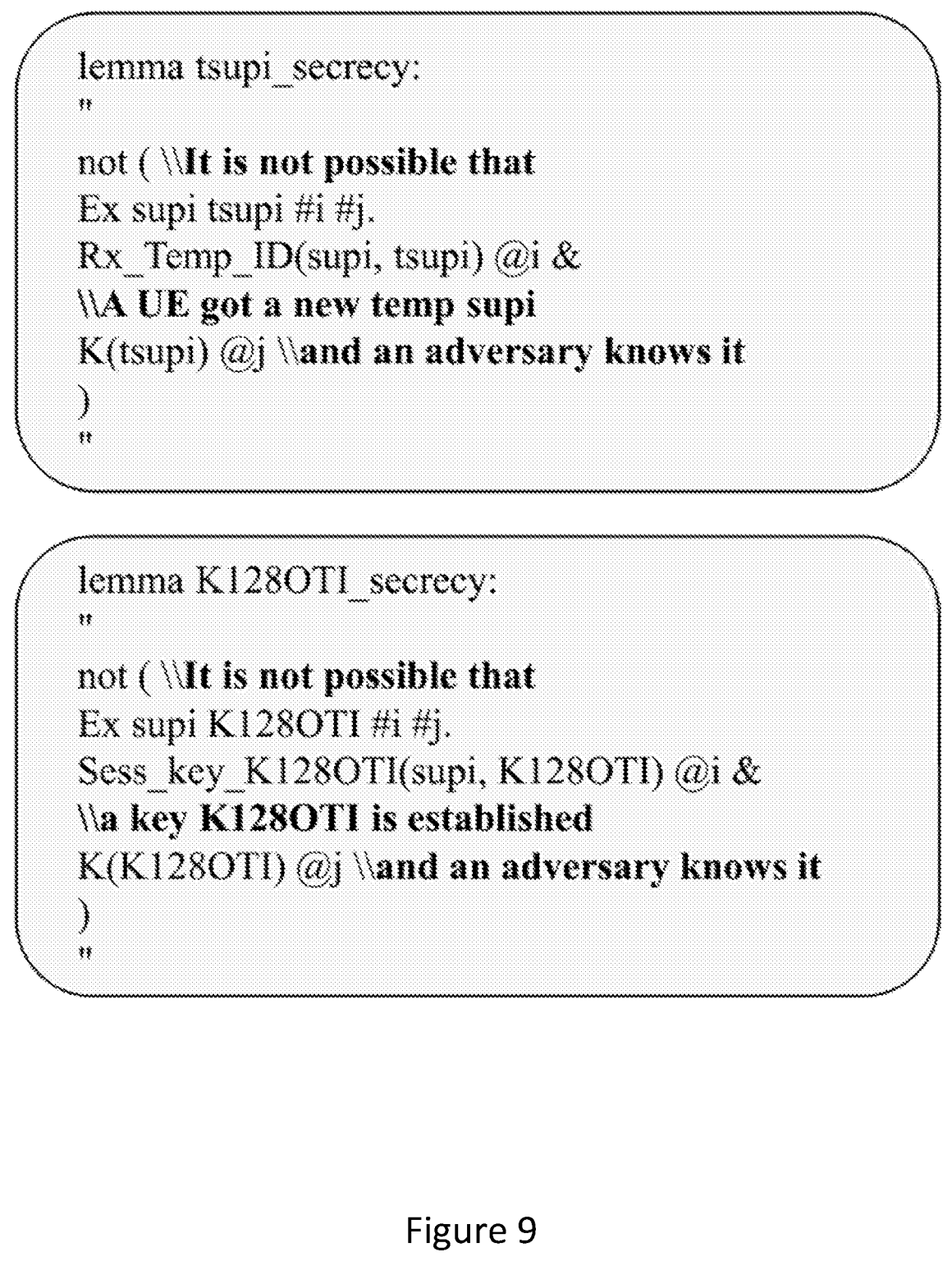

```
lemma tsupi_secrecy:
"

not ( \\It is not possible that
Ex supi tsupi #i #j.
Rx_Temp_ID(supi, tsupi) @i &
\\A UE got a new temp supi
K(tsupi) @j \\and an adversary knows it
)
"
```

```
lemma K128OTI_secrecy:
"

not ( \\It is not possible that
Ex supi K128OTI #i #j.
Sess_key_K128OTI(supi, K128OTI) @i &
\\a key K128OTI is established
K(K128OTI) @j \\and an adversary knows it
)
"
```

Figure 9

REGISTRATION METHODS USING ONE-TIME IDENTIFIERS FOR USER EQUIPMENTS AND NODES IMPLEMENTING THE REGISTRATION METHODS

CROSS-REFERENCE TO RELATED APPLICATIONS

The present application is a continuation of International Patent Application No. PCT/CN2020/138381, filed on Dec. 20, 2020, the disclosure of which is incorporated by reference herein in its entirety.

TECHNICAL FIELD

The present disclosure generally relates to the field of communication networks and, in particular, to registration methods using one-time identifiers for user equipments and to nodes implementing the registration methods.

BACKGROUND

Fifth generation (5G) mobile communication networks are going to connect much of the world's population. 5G networks introduce various novelties, including new architecture, technologies, and network services. The introduction of 5G networks will open up new challenges to security and privacy protection since these networks will carry data and signaling that contain personal information such as identity, location, and private content of users (also called subscribers). In particular, the large number of connected users raises serious concerns on privacy leakage. Moreover, since the trend of online identity theft has been on the rise recently, users generally would prefer not to reveal their permanent identities, or the permanent identities of their user equipment (UE), to other parties or to service providers and would rather remain anonymous.

5G networks (or "5G") propose encrypting user identifiers over the 5G radio access network in order to hide identities of the users and of their equipment. However, user privacy in the 5G core network (CN) is still a concern owing to the fact that the permanent user identifiers are known to all the 5G CN components.

5G specifications published by the 3rd generation partnership project (3GPP) use many identifiers that address the user as well as the UE itself. Examples of such identifiers include the subscription permanent identifier (SUPI), the permanent equipment identifier (PEI), and the generic public subscription identifier (GPSI). Such identifiers are permanent, and their revelation may cause possible risks to the user's privacy. Moreover, threats and attacks can be expected from within the core network (CN) itself. Some security challenges related to the service-based architecture adopted by 5G include:

a. Adversaries illegally accessing network functions in the 5G CN and install malicious software;
b. Adversaries illegally control a network function; and
c. Adversaries illegally gain access to sensitive user data on network function interfaces, These security challenges imply that, some CN components may not be trusted and should not have access to sensitive and private user data, including permanent user identifiers. Hence, additional level of security is needed in 5G when compared to earlier network technologies.

3GPP 5G specifications define a 5G globally unique temporary identifier (5G-GUTI), a 5G temporary mobile subscriber identity (5G-TMSI), and a 5G S-temporary mobile subscriber identity (5G-S-TMSI), which are all intended to provide some level of anonymity to the 5G users. However, these improvements do not prevent the various CN components from getting access to permanent user identities.

Various security schemes have been proposed to improve the authentication performance and protect user privacy. For example, an efficient and secure service-oriented authentication framework for 5G Internet of Things (IoT) services has been proposed in order to prevent the leakage of services information that users are interested in. However, the applied cryptographic methods for content privacy preservation are complex. To protect against international mobile user identity (IMSI) catchers, a pseudonym-based solution has been proposed, in which a user equipment identifies itself with a temporary identifier instead of the IMSI. However, this solution does not protect the SUPI and the other user permanent identifiers. This is because the solution only considers active attackers over the air-interface, using a fake Long Term Evolution (LTE) base station for instance, and does not consider the possibility of attacks from within the 5G core network itself when a 5G core component becomes compromised. Others have proposed a secure, efficient, and lightweight authentication and key agreement (AKA) protocol that does not require a public key infrastructure (PKI) for 5G networks, this method aiming to minimize denial of service attacks, defend against replay attacks, and reduce authentication time latency. Other techniques intend to protect user location information, prevent the leakage of user activity, and improve the resistance against active attacks and malicious serving networks using another 5G authentication protocol. Another scheme for the 5G attach procedure that does not require a global PKI proposes to prevent man-in-the-middle and linkability attacks and to protect user privacy. However, these solutions only protect the IMSI and the SUPI of the users. A security authentication scheme for 5G ultra dense networks based on the blockchain technology has also been proposed. However, it had a different objective which is to minimize the number of required interactions and authentications when a user moves between different access points.

Consequently, there is a need for solutions that protect various forms of permanent user and user equipment identities in the 5G core network.

SUMMARY

An object of the present disclosure (that is, one of the directions that may result in one or more potential benefits resulting from one or more embodiments described herein) is to provide a registration method implemented in a user equipment (UE), comprising:

sending, from the UE, a first registration request toward a trusted node of a core network (CN), the first registration request including a first temporary identifier stored in a memory device of the UE;

receiving, at the UE, a first registration response from the trusted node, the first registration response including a first random challenge;

using, at the UE, the first random challenge to generate a second temporary identifier for the UE; and overwriting, in the memory device of the UE, the first temporary identifier with the second temporary identifier.

In at least one embodiment, the registration method further comprises using, at the UE, the first temporary identifier to communicate with other nodes of the CN after receiving the first registration response.

In at least one embodiment, the registration method further comprises sending, from the UE, a second registration request toward the trusted node, the second registration request including the second temporary identifier; receiving, at the UE, a second registration response from the trusted node, the second registration response including a second random challenge; using, at the UE, the second random challenge to generate a third temporary identifier for the UE; and overwriting, in the memory device of the UE, the second temporary identifier with the third temporary identifier.

In at least one embodiment, the registration method further comprises using, at the UE, the second temporary identifier to communicate with other nodes of the CN after receiving the second registration response.

In at least one embodiment, the registration method further comprises selecting, at the UE, the first temporary identifier from a pool of temporary identifiers stored in the memory device of the UE before sending the first registration request toward the trusted node the first temporary identifier; wherein the first temporary identifier is overwritten with the second temporary identifier within the pool of temporary identifiers.

In at least one embodiment, the first temporary identifier is randomly selected from the pool of temporary identifiers stored in the memory device of the UE.

In at least one embodiment, the registration method further comprises selecting, at the UE, a third temporary identifier from the pool of temporary identifiers stored in the memory device of the UE; sending, from the UE, a second registration request toward the trusted node, the second registration request including the third temporary identifier; receiving, at the UE, a second registration response from the trusted node, the second registration response including a second random challenge; using, at the UE, the second random challenge to generate a fourth temporary identifier for the UE; and overwriting the third temporary identifier with the fourth temporary identifier within the pool of temporary identifiers.

In at least one embodiment, the registration method further comprises selecting, at the UE, a third temporary identifier from the pool of temporary identifiers stored in the memory device of the UE; sending, from the UE, a second registration request toward the trusted node, the second registration request including the third temporary identifier; determining, at the UE, that a second registration response carrying a second random challenge has not been received from the trusted node after a predetermined time delay; selecting, at the UE, a fourth temporary identifier from the pool of temporary identifiers stored in the memory device of the UE; sending, from the UE, a third registration request toward the trusted node, the third registration request including the fourth temporary identifier; receiving, at the UE, a third registration response from the trusted node, the third registration response including a third random challenge; using, at the UE, the third random challenge to generate a fifth temporary identifier for the UE; and overwriting the fourth temporary identifier with the fifth temporary identifier within the pool of temporary identifiers.

In at least one embodiment, using, at the UE, the first random challenge to generate a second temporary identifier for the UE comprises: inputting, at the UE, the first temporary identifier and an encryption key of the UE into a key derivative function to generate a first intermediate output; truncating, at the UE, the first intermediate output to a predetermined length to generate a one-time-identifier (OTI)

encryption key; applying, at the UE, the first random challenge and the OTI encryption key to an exclusive OR function to generate a second intermediate output; and applying, at the UE, the second intermediate output to a reverse optimal asymmetric encryption padding function to generate the second temporary identifier.

In at least one embodiment, the encryption key of the UE is a long-term key K of the UE.

In at least one embodiment, the registration method further comprises receiving, at the UE, an identity request from an untrusted node of the CN; sending, from the UE, an identity response toward the untrusted node, the identity response including a first temporary equipment identifier (TPEI) stored in a memory device of the UE; receiving, at the UE, a registration accept message from the untrusted node, the registration accept message including an encrypted version of a second TPEI; using, at the UE, the OTI encryption key to decrypt the encrypted version of the second TPEI; and overwriting, in the memory device of the UE, the first TPEI with the second TPEI.

In at least one embodiment, the registration accept message also includes an encrypted version of a second TGPSI, the registration method further comprising: using, at the UE, the OTI encryption key to decrypt the encrypted version of the second TGPSI; and overwriting, in the memory device of the UE, a first TGPSI with the second TGPSI.

In at least one embodiment, the first temporary identifier is a first temporary subscription permanent identifier (TSUPI) of the UE; and the first temporary identifier is included in the registration request in an encrypted form.

In at least one embodiment, the encrypted form of the first TSUPI is a first temporary subscription concealed identifier (TSUCI) of the UE obtained by encrypting the first TSUPI with a public key of the CN.

In at least one embodiment, the public key of the CN is a public key of a mobile network operator (MNO) for the UE.

In at least one embodiment, the registration method further comprises after receiving, at the UE, the first registration response from the trusted node, sending, from the UE toward the trusted node, a registration complete message including a field acknowledging receipt of the second temporary identifier.

Another object of the present disclosure is to provide a user equipment (UE), comprising:

a transceiver adapted for allowing the UE to communicate with nodes of a core network (CN) over a radio access network (RAN);

a memory device; and a processor operatively connected to the transceiver and to the memory device;

the memory device comprising a non-transitory computer readable storage medium for storing instructions that are executable by the processor for performing operations of the registration method implemented the UE.

A further object of the present disclosure is to provide a registration method implemented in a unified data management (UDM) of a core network (CN), the UDM being identified as a trusted node of the CN, the registration method comprising:

receiving, at the UDM, a first registration request from a user equipment (UE), the first registration request including a first temporary identifier of the UE; and if the UDM determines that the first temporary identifier of the UE is stored in a memory device of the UDM; generating, at the UDM, a second temporary identifier of the UE,

5 overwriting, in the memory device of the UDM, the first temporary identifier with the second temporary identifier, generating, at the UDM, a first random challenge based on the second temporary identifier of the UE, and sending, from the UDM toward the UE, a first registration response including the first random challenge.

In at least one embodiment, the registration method further comprises rejecting, at the UDM, the registration request if the UDM determines that the first temporary identifier of the UE is not stored in the memory device of the UDM.

In at least one embodiment, the registration method further comprises comprising using, at the UDM, the first temporary identifier of the UE to communicate with other nodes of the CN after sending the first registration response.

In at least one embodiment, the registration method further comprises receiving, at the UDM, a second registration request from the UE, the second registration request including a third temporary identifier; and if the UDM determines that the third temporary identifier of the UE is stored in the memory device of the UDM; generating, at the UDM, a fourth temporary identifier of the UE, overwriting, in the memory device of the UDM, the third temporary identifier with the fourth temporary identifier, generating, at the UDM, a second random challenge based on the fourth temporary identifier of the UE, and sending, from the UDM toward the UE, a second registration response including the fourth random challenge.

In at least one embodiment, the registration method further comprises comprising using, at the UDM, the third temporary identifier of the UE to communicate with other nodes of the CN after sending the second registration response.

In at least one embodiment, the memory device of the UDM stores a pool of temporary identifiers for the UE; and the first temporary identifier is overwritten with the second temporary identifier within the pool of temporary identifiers.

In at least one embodiment, the second temporary identifier of the UE is randomly generated at the UDM.

In at least one embodiment, generating, at the UDM, the first random challenge based on the second temporary identifier of the UE comprises: inputting, at the UDM, the first temporary identifier and an encryption key of the UE into a key derivative function to generate a first intermediate output; truncating, at the UDM, the first intermediate output to a predetermined length to generate a one-time-identifier (OTI) encryption key; applying, at the UDM, the second temporary identifier to an optimal asymmetric encryption padding function to generate a second intermediate output; applying, at the UDM, the OTI encryption key and the second intermediate output to an exclusive OR function to generate the first random challenge.

In at least one embodiment, the encryption key of the UE is a long-term key K of the UE stored in the memory device of the UDM.

In at least one embodiment, the first temporary identifier is a first temporary subscription permanent identifier (TSUPI) of the UE; and the first temporary identifier is included in the registration request in an encrypted form.

In at least one embodiment, the encrypted form of the first TSUPI is a first temporary subscription concealed identifier (TSUCI) of the UE; the method further comprising using, at the UDM, a private key of the CN to decrypt the first TSUCI to recover the first TSUPI.

In at least one embodiment, the private key of the CN is a private key of the UDM.

In at least one embodiment, the registration method further comprises, after sending the first registration response from the UDM toward the UE, receiving, from the UE at the UDM, a registration complete message including a field acknowledging receipt of the second temporary identifier.

In at least one embodiment, the registration method further comprises receiving, from another trusted node of the CN, a request for providing location information of the UE; and responding, from the UDM to the other trusted node of the CN, by providing a network address of an untrusted node of the CN that is currently serving the UE.

In at least one embodiment, the registration method further comprises receiving, at the UDM from another trusted node of the CN, a request for resolving a temporary generic public subscription identifier (GPSI) of the UE; responding, from the UDM to the other trusted node of the CN, with a GPSI of the UE; receiving, at the UDM from the other trusted node of the CN, a request for resolving a GPSI of a party called by the UE; and responding, from the UDM to the other trusted node of the CN, with a temporary GPSI of the party called by the UE.

In at least one embodiment, responding, from the UDM to the other trusted node of the CN, with the GPSI of the UE comprises: sending, from the UDM to the other trusted node of the CN, a temporary subscription permanent identifier (TSUPI) of the UE, receiving, at the UDM from the other trusted node of the CN, the TSUPI of the UE, and sending, from the UDM to the other trusted node of the CN, the GPSI of the UE; and responding, from the UDM to the other trusted node of the CN, with the temporary GPSI of the party called by the UE comprises: sending, from the UDM to the other trusted node of the CN, a TSUPI of the party called by the UE, receiving, at the UDM from the other trusted node of the CN, the TSUPI of the party called by the UE, and sending, from the UDM to the other trusted node of the CN, the GPSI of the UE.

In at least one embodiment, the registration method further comprises receiving, at the UDM from a first untrusted node of the CN, a first request to register the untrusted node of the CN as a serving node for the UE, the first request including the first temporary identifier of the UE; receiving, at the UDM from the first untrusted node of the CN, a second request for fetching user data for the UE, the second request including the first temporary identifier of the UE; sending the user data for the UE from the UDM to the untrusted node of the CN; and sending, from the UDM to the untrusted node of the CN, a deregistration message including a previous temporary identifier of the UE.

In at least one embodiment, the registration method further comprises receiving, at the UDM from a second untrusted node of the CN, a request for session management subscription data for the UE, the first request including the first temporary identifier of the UE; and sending, from the UDM to the second untrusted node of the CN, a response indicating that the first temporary identifier of the UE and the previous temporary identifier of the UE are both temporary identifiers for the UE.

Yet another object of the present disclosure is to provide a unified data management (UDM), comprising:

an input/output device adapted for allowing the UDM to communicate with nodes of a core network (CN) and with a user equipment (UE);

a memory device; and a processor operatively connected to the transceiver and to the memory device;

the memory device comprising a non-transitory computer readable storage medium for storing instructions that are executable by the processor for performing operations of the registration method implemented in the UDM.

A further object of the present disclosure is to provide a registration method implemented in an equipment identity register (EIR) of a core network (CN), the EIR being identified as a partially trusted node of the CN, the registration method comprising:

receiving, at the EIR from an access and mobility management function (AMF), an equipment identity verification request including a temporary equipment identifier (TPEI) for a user equipment (UE);

selectively forwarding the received TPEI from the EIR to a unified data management (UDM);

receiving, at the EIR from the UDM, a new TPEI; and forwarding the new TPEI from the EIR to the AMF.

A still further object of the present disclosure is to provide an equipment identity register (EIR), comprising:

an input/output device adapted for allowing the EIR to communicate with nodes of a core network (CN);

a memory device; and a processor operatively connected to the transceiver and to the memory device;

the memory device comprising a non-transitory computer readable storage medium for storing instructions that are executable by the processor for performing operations of the registration method implemented in the EIR.

BRIEF DESCRIPTION OF THE FIGURES

The features and advantages of the present disclosure will become apparent from the following detailed description, taken in combination with the appended drawings, in which:

FIG. 6 shows a format of an $OTI_{ACK}$ parameter sent in the registration complete signal;

FIG. 9 shows lemmas defined for studying the secrecy properties for the $TSUPI_{N+1}$ and for the encryption key $K_{128OTI}$;

Figure 1:
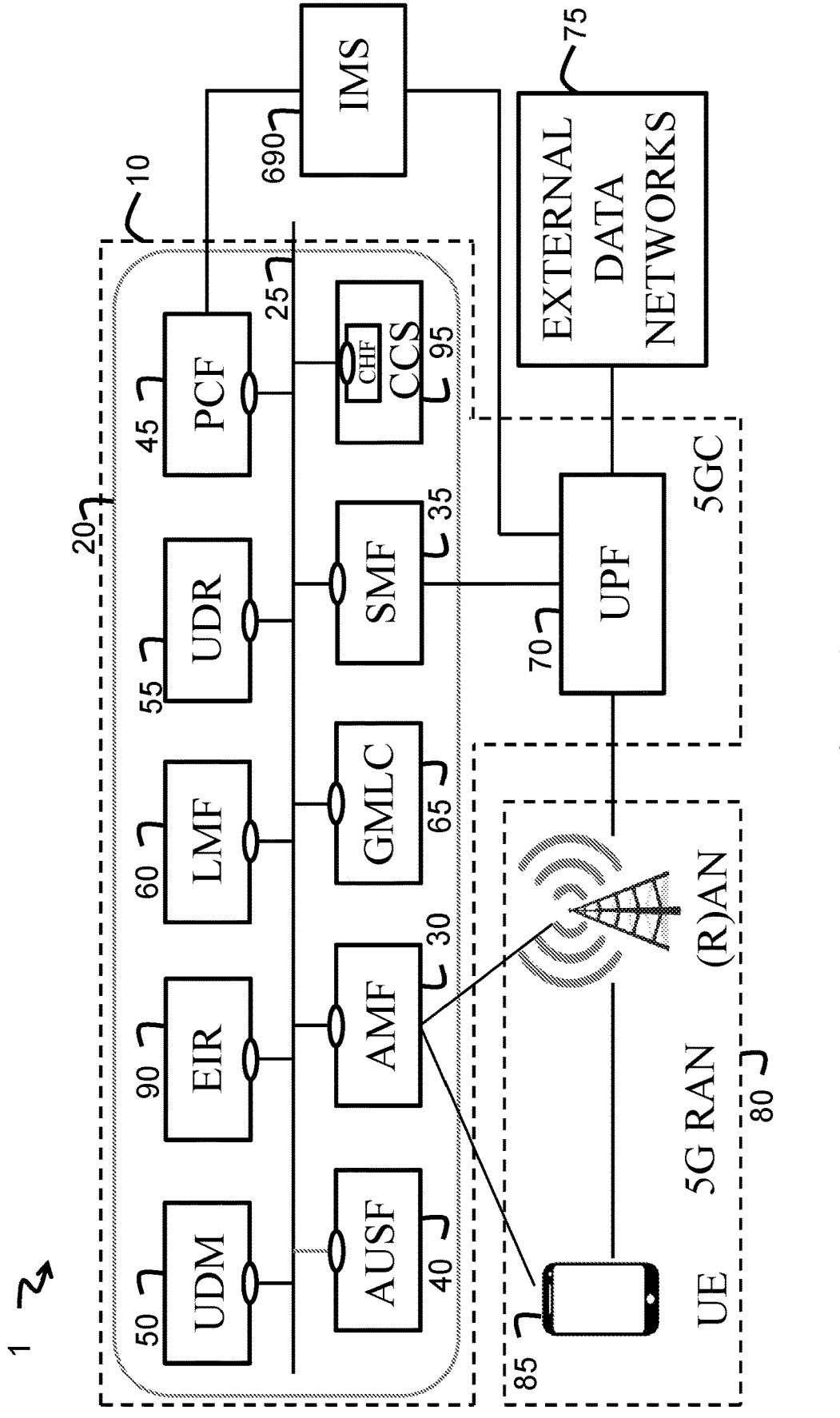
FIG. 1 shows a simplified version of a 5G architecture defined in 3GPP 5G specifications.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined or indicted by context, all technical and scientific terms used herein have the same meaning as commonly understood by one of ordinary skill in the art to which the described embodiments appertain to.

Generally speaking, the present technology is intended to protect user privacy in fifth generation (5G) core networks (CN) using a One-Time Identifier (OTI) procedure. Since the 5G standard is open to implementing new security schemes and to enhance user privacy, the present disclosure applies an OTI solution in the 5G registration procedure to limit the number of CN components allowed to access to permanent user identifiers, which include subscription permanent identifier (SUPI), permanent equipment identifier (PEI), and general public subscription identifier (GPSI). Using OTI, users of 5G networks, for example mobile users, employ temporary 5G identifiers instead of their permanent 5G identifiers. The OTI-based 5G registration procedure of the present disclosure may be seamlessly applied to various 5G services.

As used herein, an OTI security technology for 5G prevents user privacy leakage by limiting a number of components of the 5G CN receiving access of the permanent identifiers for this user. Some components (or nodes) of the 5G CN are deemed trusted and some others are deemed untrusted. In the event where an untrusted component of the 5G CN becomes compromised, the user privacy is maintained because the untrusted component of the 5G CN has not been given access to the permanent user identifiers. In more details, the number of components of the 5G CN that are granted access to the permanent user identifiers is limited by modifying the conventional 5G registration procedure and by assigning a set of OTIs to users. Using the present OTI-based 5G registration procedure, users identify themselves to the 5G CN using temporary identifiers that may change over time. This set of temporary user identifiers is tracked and maintained by a small number of trusted components of the 5G CN including, for example and without limitation, a unified data management (UDM) and a unified data repository (UDR), which are both defined in 5G specifications. In an aspect, 5G services may still operate using the OTI-based 5G registration procedure and the temporary identifiers.

It should be understood that, while 5G networks support mobility of users (or subscribers) and of their equipment (called "user equipment"—UE), it is expected that many users and user devices may be stationed in fixed locations. Non-limiting examples may include a variety of devices used in the context of so-called "Internet of Things" (IoT). For that reason, in the context of the present disclosure, mentions of "5G mobile communication networks" and similar mentions do not limit the generality of the present disclosure, which may equally apply to fixed and mobile users as well as to fixed and mobile UEs.

It should also be understood that the present OTI-based registration procedure is not limited to cellular communications in 5G networks, i.e. between a mobile device and the 5G core network. For example and without limitation, the present OTI-based registration procedure may be employed as part of the 5G registration procedures in Autonomous Vehicles (Vehicular networks), IoT in Smart City Infrastructure, Traffic Management, and Industrial Automation, Augmented Reality and Virtual Reality, Drones, and Wearables.

In the context of the present disclosure, the terms "user", "subscriber" and "UE" may sometimes be used interchangeably. A subscriber generally refers to a person or other entity that owns a subscription to a service and pays for the subscription. A user usually refers to a person who may be distinct from the paying subscriber and who is distinct from the UE. As such, a user may not be able to send and receive signals to and from a network, as signaling exchanges take place between a user device, the UE, and the network. In the context of IoT, a user may be a device connected to a UE. The present disclosure uses the terms "user", "subscriber" and "UE" in a manner that is intended to simplify the illustration of the various embodiments, without any intent to limit the generality of the disclosed technology.

The present disclosure includes an analysis of the secrecy properties of the OTI scheme. This analysis verifies the secrecy of the assigned temporary identifiers and confirms the efficiency of the present technology in avoiding compromising of user identities by an adversary. The analysis has been made using a "Tamarin Prover" security protocol verification tool, which is a symbolic analysis tool based on multi-set rewriting rules and first order logic, available on the Github web site (https://tamarin-prover.github.io/). Results show that by applying OTI, a compromised component of the 5G CN that has been identified as untrusted may remain unable to learn a user's identity during registration and authentication processes. Furthermore, an analysis of the operation of some 5G services (location services, billing and charging services, and call setup) using the OTI-based 5G registration protocol shows that these services may still seamlessly operate with temporary identifiers in place.

The present OTI scheme may be implemented in the existing 5G networks with minimal changes to the 3rd generation partnership project (3GPP) 5G specifications.

As mentioned earlier, not all CN components should be trusted with sensitive user data and permanent identifiers. Hence, a wise approach is to limit the number of CN components that have access to permanent user identifiers. Therefore, the present technology goes one step further towards protecting the user permanent identifiers. Contrary to the previous works, the present technology introduces a modified 5G registration scheme that protects the SUPI, PEI, and GPSI (which are the permanent identities of the UEs in 5G) using the concept of one-time identifiers (OTI). In an embodiment, this is accomplished by means of establishing temporary identifiers that frequently change between the UE and the core components in 5G network. The temporary identifiers may be derived locally at the UE and in the home network of the user, without affecting existing universal subscriber identity modules. Consequences brought by the introduction of the OTI approach are twofold:

It is no longer necessary to use long-term permanent user identifiers in many signaling exchanges between the UE and the 5G CN; and The temporary identifiers may change frequently in order to prevent an adversary, who was able to compromise a CN component, to track user activity.

The present disclosure presents the present technology from a technical perspective, and then assesses its feasibility. A formal verification analysis to the disclosed OTI-based 5G registration scheme is then provided.

I. Overview of the 5G System

I-A. 5G Core Network Architecture

FIG. 1 shows a simplified version of a 5G architecture 1 defined in 3GPP 5G specifications. In the 5G architecture 1, a 5G CN 10 adopts a separation between a control plane and a user plane to allow for scalability and flexible deployment of 5G services. The upper part of the 5G CN 10 in FIG. 1 constitutes the control plane where each network function interacts in a service-based architecture 20 and exposes its functionality through a service-based interface 25. Example of network functions in the control plane include an access and mobility management function (AMF) 30, a session management function (SMF) 35, an authentication server function (AUSF) 40, a policy control function (PCF) 45, a unified data management (UDM) 50, a unified data repository (UDR) 55, an equipment identity register (EIR) 90 (also referred to as 5G-EIR in the present specification), a converged charging system (CCS) 95 that includes a charging function (CHF), a location management function (LMF) 60, and a gateway mobile location center (GMLC) 65. These network functions interact over the service-based interface 25, as shown in FIG. 1.

The AMF 30 is responsible for non-access stratum ciphering and integrity protection, registration management, connection management, mobility management, and access authentication and authorization. The SMF 35 is responsible for session management, Internet Protocol (IP) address allocation and management for the user/subscriber, and termination of non-access stratum signaling related to session management. The AUSF 40 acts as an authentication server. The PCF 45 provides policy rules to functions of the control plane and provides access subscription information for policy decisions in the UDR 55. The UDM 50 is responsible for the generation of authentication and key agreement (AKA) credentials, user identification handling, access authorization, and subscription management. The 55 UDR is responsible for storage and retrieval of subscription data by the UDM 50, of policy data by the PCF 45, and of structured data for exposure. The EIR 90 holds information about the mobile devices serial numbers and whether they are blacklisted or not. This information held by the EIR 90 may comprise a permanent equipment identifier (PEI) for each mobile device. The CCS 95 is responsible for subscriber charging and provides an interface with the billing domain. The LMF 60 is responsible for location determination for a user and obtaining location measurements. The GMLC 65 supports location services.

The lower part of the 5G CN 10 forms the user plane, including a user plane function (UPF) 70, which is responsible for packet routing and forwarding, packet inspection, quality of service handling, and acts as an external packet data unit (PDU) session point of interconnect to external data networks (DN) 75. The 5G CN 10 operates jointly with a 5G radio access network (RAN) 80 to provide access, to one or more UEs 85, to services of the 5G CN 10 and of the external data networks (DN) 75. Finally, the IP multimedia subsystem (IMS) 690 is a subsystem that 5G relies on for providing voice and multimedia services.

I-B. 5G Identifiers

In 5G, several identifiers are used at the user level and at the equipment level (i.e. at the UE 85). Some of these identifiers are permanent, whereas, to support user confidentiality protection, other identifiers are dynamic. The relevant identifiers to the present technology comprise permanent identifiers, which include the SUPI, the PEI, and the GPSI, as mentioned hereinabove, as well as dynamic identifiers, which include the subscription concealed identifier (SUCI), the 5G globally unique temporary identifier (5G-GUTI), the 5G temporary mobile subscriber identity (5G-TMSI), and the 5G S-temporary mobile subscriber identity (5G-S-TMSI). It is worth mentioning that permanent identifiers do not change during the lifetime of the subscription for a user. Hence, by recognizing a permanent identifier, a user's identity may be revealed. Hence, in order to enhance user privacy, it is desired to protect the user's permanent identifiers by limiting the number of CN components that have access to them. Some 5G identifiers are briefly explained as follows:

I-B.1) SUPI

Every user in 5G is assigned a globally unique identifier called SUPI, which is a permanent identifier. It is defined in 3GPP 5G specifications and is provisioned in the UDM 50 and in the UDR 55. The SUPI may contain an international mobile subscriber identity (IMSI), which is a unique identifier allocated to users in various systems, such as global system for mobile (GSM), universal mobile telephone system (UMTS) and evolved packet system (EPS). Alternatively, the SUPI may contain a network specific identifier, which takes a network access identifier (NAI) format. In case the SUPI contains an IMSI, it is a 15-digits decimal number, win which the first 3 digits represent the mobile country code (MCC), the next 2 or 3 digits represent the mobile network code (MNC), the last 9 or 10 digits representing the mobile subscription identification number (MSIN) that identifies the mobile subscription within a public land mobile network (PLMN).

I-B.2) PEI

The PEI, which is a permanent identifier, identifies the mobile equipment itself, i.e. the UE 85. They PEI may indicate an international mobile equipment identity (IMEI) or an IMEI and software version number (IMEISV). Hence, the UE of a user indicates the PEI and its format to the network. In case the PEI indicates an IMEI, it contains an 8-digit type allocation code (TAC) and a 6-digit serial number (SNR). PEI may be used to check whether a given UE is blacklisted or not.

I-B.3) GPSI

The GPSI is a permanent public identifier that is used inside and outside 3GPP 5G specifications for addressing a 3GPP subscription in different data networks. The GPSI may indicate a mobile subscriber ISDN number (MSISDN) or an external identifier. In case the GPSI indicates an MSISDN, it has a maximum length of 15 digits and is composed of 1 to 3 digits country code (CC), a national destination code (NDC), and a subscriber number (SN) such that the length of NDC+SN is 12 to 14 digits.

I-C. 5G Trust Model

In cellular networks in general, and in 5G networks in particular, a trust model determines which entities are trusted with sensitive user data. Trust models introduced in fourth generation (4G) LTE networks comprise entities like subscribers (users), mobile equipment (ME—another term for the UE 85), mobile network operators (MNOs), virtual MNOs (VMNOs), service providers, and equipment manufacturers. Conventionally, a user and its UE 85 trust the MNOs, the VMNOs, and the service providers, and generally assume that the terms and conditions in the subscription contracts with the MNOs will be followed properly. The MNOs are responsible for providing network connectivity to the users in a manner that should protect user privacy. However, some vulnerabilities have been reported, in which a user's long term identifier (IMSI) was eavesdropped over the air.

In conventional 5G procedures, a public key encryption mechanism is used to protect the SUPI (the 5G equivalent to the 4G IMSI) over the RAN 80. The UE encrypts SUPI by the MNO's public key to generate the SUCI and sends the encrypted SUCI over the air to the AMF 30. Although, the AMF 30 cannot extract the SUPI from the received SUCI, it relays the SUCI to the UDM 50 and later receives the decrypted version of the SUCI from the UDM 50. Thereafter, the SUPI is transmitted between all the components of the 5G CN 10 in order to identify the user. Hence, in conventional 5G procedures, it is generally assumed that all CN components are trusted and are given access to all permanent user identifiers.

I-D. 5G Registration Procedure

Figure 2:
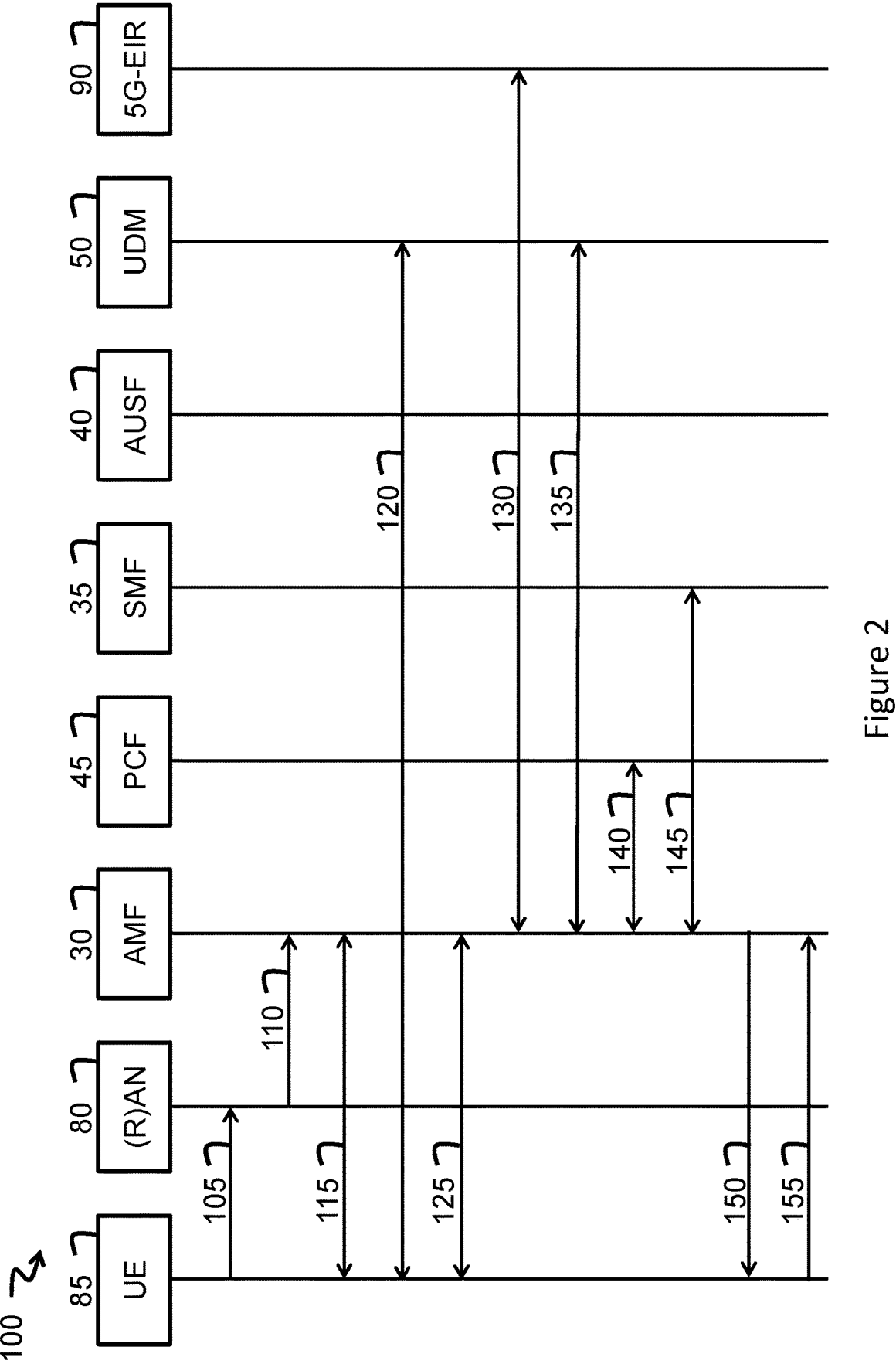
FIG. 2 summarizes the original 5G UE registration procedure described in 3GPP 5G specifications.

FIG. 2 summarizes the conventional 5G UE registration procedure 100 described in 3GPP 5G specifications. The order of the various operations of the sequence 100 may differ from the illustration of FIG. 2 and some operations may not be present in some embodiments. The 5G UE registration procedure 100 starts at operations 105 and 110 with the UE 85 sending a registration request signal, via an access network (AN), for example and without limitation the RAN 80, to the AMF 30. The registration request signal indicates the registration type. The UE 85 identifies itself by either its SUCI, 5G-GUTI, or PEI. In case the SUCI is not provided by the UE 85, the AMF 30 may obtain the SUCI from the UE 85 at operation 115. At operation 120, selection of the AUSF 40 takes place between the UE 85 and the UDM 50 and an authentication procedure for the UE 85 is performed according to 3GPP 5G specifications. During operation 120, the UDM 50 decrypts the SUCI and sends back the SUPI to the AMF 30. Thereafter, in case the UE 85 has not provided its PEI to the AMF 30, the AMF 30 may obtain the PEI from the UE 85 at operation 125. Using the provided PEI, the AMF 30 then contacts a 5G equipment identity register (EIR) 90 at operation 130 to check the status the PEI, thereby verifying that the UE 85 has not been blacklisted. At operation 135, based on the provided SUPI, the AMF 30 selects the UDM 50, registers therewith, and fetches relevant user subscription data for the UE 85. In this operation 135, the AMF 30 obtains the GPSI for the user. After that, at operation 140, the AMF 30 establishes an access and mobility policy association with the PCF 45, following which the AMF 30 performs a PDU session update with the SMF 35 at operation 145. Finally, the AMF 30 sends a registration accept message to the UE at operation 150, to which the UE responds by sending a registration complete signal at operation 155. At that time, the 5G registration procedure is completed.

It is observed that the fact that a CN component may recognize different identifiers and determine that they belong to the same user might open the door for traceability attacks. In a traceability attack, an adversary might deduce whether different services are being delivered to the same user or not. This might be accomplished by noting the services delivered to different identifiers and then deducing that these identifiers belong to the same user.

II. One-Time Identifier Scheme of the Present Technology

II-A. One-Time Identifier

As described earlier, each user in 5G is assigned the following permanent identifiers: SUPI, PEI, and GPSI, which may be understood as an 'original SUPI', an 'original PEI', and an 'original GPSI', respectively. Any one of these permanent identifiers may reveal the user identity. The root cause of potential privacy leakages in 5G lies in the incorrect assumption that all CN components may be trusted and may legitimately access the long-term permanent identifiers. This may be problematic in case some CN components become compromised. Hence, in order to protect the user privacy, the present technology does not assume that all components of the 5G CN 10 are trusted. In an embodiment, the present technology determines that different CN components have different levels of trusts. Table I shows a trust model compared to the 5G trust model according to an embodiment of the present technology.

TABLE I

| | Components | |
|---|---|---|
| | Conventional 5G | The present technology |
| Trusted | AMF, AUSF, CCS, EIR, GMLC, IMS, LMF, PCF, SCM, UDM, UDR and UPF | GMLC, IMS, UDM and UDR |
| Partially Trusted | N/A | CCS and EIR |
| Untrusted | N/A | AMF, AUSF, LMF, PCF, SMF and UPF |

As shown in Table I, conventional 5G technology assumes that all 5G core network nodes implement 5G protocols and procedures faithfully and may be fully trusted. In contrast, the present technology may consider up to three trust levels for three different types of CN components, these levels including trusted, partially-trusted, and untrusted.

A trusted CN component is allowed to know the permanent user identifiers and is able to track temporary identifiers that are assigned to users according to various embodiments of the present technology. A partially trusted CN component is one that is not allowed to know the permanent user identifiers but is allowed to recognize that a set of temporary identifiers, which are defined by the present technology, belong to the same user without revealing the original permanent user identifier. Finally, an untrusted CN component is neither allowed to know the user's permanent identifiers, nor allowed to recognize that a set of temporary identifiers belong to the same user.

According to an embodiment of the present technology, in the OTI-based 5G registration procedure, each UE 85 maintains its original identifiers as defined in 3GPP 5G specifications, and further maintains a set of temporary identifiers. This set of temporary identifiers is known to the trusted CN components and may be used in an OTI-based 5G-AKA scheme. The set of temporary identifiers may, for example and without limitation, contain one or more temporary SUPIs (TSUPIs), one or more temporary PEIs (TPEIs), and one or more temporary GPSIs (TGPSIs). In an embodiment, a pool of temporary PEIs (TPEIs) for each mobile device may be held in the EIR 90. In an embodiment, the TSUPIs may adopt a format similar to that of the SUPIs, the TPEIs may adopt a format similar to that of the PEIs, and the TGPSIs may adopt a format similar to that of the GPSIs, thereby allowing untrusted and partially trusted CN components to transparently use these identifiers.

In an embodiment, a single TSUPI, a single TPEI and a single TGPSI may be defined for a given UE 85. In another embodiment, plural temporary identifiers may be included in a set defined by a given UE 85. When pluralities of TSUPIs, TPEIs and/or TGPSIs are defined for a given UE 85, these temporary identifiers form an identifier pool for each temporary identifier type. In each UE 85, the universal subscriber identity module may include a set of N temporary identifiers $\{TempID_1, TempID_2, \ldots, TempID_n, \ldots, TempID_N\}$. The use of a plurality of temporary identifiers may help to mitigate problems related to loss of synchronization when there is a mismatch between the identifier pools maintained at the user side and the CN side.

Figure 3:
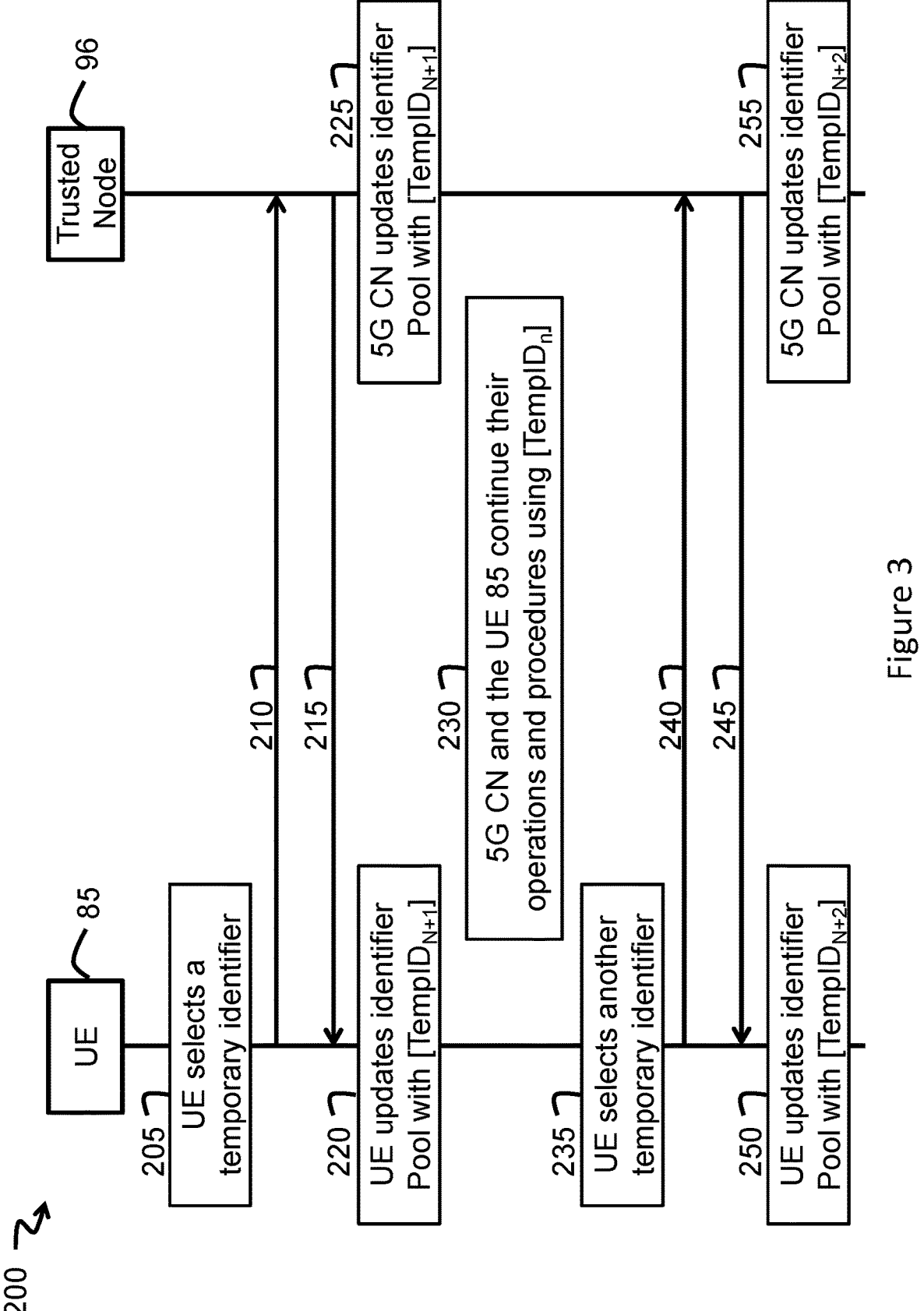
FIG. 3 shows an OTI-based registration procedure according to an embodiment of the present technology.

FIG. 3 shows an OTI-based registration procedure 200 according to an embodiment of the present technology. The order of the various operations of the sequence 200 may differ from the illustration of FIG. 3 and some operations may not be present in some embodiments. The registration procedure 200 includes internal processes taking place within the UE 85 and within a trusted node 96 of the 5G CN 10, which may for example be the UDM 50. The registration procedure 200 also includes signaling exchanges between the UE 85 and the trusted node 96. The UE 85 holds a temporary identifier, or a pool of temporary identifiers. The trusted node 96 holds an equivalent temporary identifier or pool of temporary identifiers for a plurality of UEs including the UE 85. The following description of the registration procedure 200 suggests the use of temporary identifier pools, without limiting the applicability of this procedure 200 to cases where a single temporary identifier is used.

At operation 205, the UE 85 determines that it needs to send a registration request. The US 85 selects a temporary identifier $TempID_n$ randomly from its identifier pool (or uses its single TempID, if the identifier pool comprises a single temporary identifier) and sends a registration request carrying the selected $TempID_n$ at operation 210. In the context of the present disclosure, the selection of the temporary identifier $TempID_n$ may be truly random or pseudorandom, so the temporary identifier $TempID_n$ may be selected by any random or pseudorandom technique. The trusted node 96 already holds information about the pool of temporary identifiers as well as the permanent identifiers for the UE 85. Hence, the trusted node 96 remains able to recognize the UE 85 despite the fact that the registration request is received without a permanent identity of the UE 85. Upon reception of the registration request from the UE 85, the registration request including the temporary identifier, the trusted node 96 randomly generates a new temporary identifier $TempID_{N+1}$ while performing registration and authentication of the UE 85, and sends it back to the UE 85 at operation 215. Generation of the new identifier by the trusted node 96 is described hereinbelow. It may be noted that, since the trusted node 96 is responsible for the generation and the management of the temporary identifiers, the trusted node 96 may be configured to prevent simultaneously assigning the same temporary identifiers to two or more different users (i.e. to different UEs 85). In other words, if the trusted node 96 generates a new random temporary identifier $TempID_{N+1}$ and finds out that this $TempID_{N+1}$ is already assigned to another UE 85, it may generate another random $TempID_{N+1}$. It may be noted that the trusted node 96 may reject the registration request if it does not recognize the $TempID_n$.

Having received the new temporary identifier $TempID_{N+1}$, the UE 85 replaces the used temporary identifier (i.e., the temporary identifier selected at operation 205) in its identifier pool with the newly generated temporary identifier $TempID_{N+1}$ at operation 220. This replacement, which may also be called overwriting, makes $TempID_{N+1}$ the operative temporary identifier and makes previous temporary identifiers no longer operative; overwriting does not necessarily imply that that an operative temporary identifier occupies the same memory as a previous temporary identifier, nor that any previous temporary identifier is purged from memory. Hence, the updated UE identifier pool becomes $\{TempID_1, TempID_2, \ldots, TempID_{N+1}, \ldots, TempID_N\}$. Concurrently with operation 220, the trusted node 96 also replaces the used temporary identifier $TempID_{N+1}$ in the identifier pool for the UE 85 with the newly assigned temporary identifier at operation 225. It may be noted that the trusted node 96 may execute operation 225 before or after operation 215.

At operation 230, which may continue over an extended period, the UE 85 continues operating in the 5G CN 10 using the temporary identifier $TempID_n$ selected at operation 205, given that this is the temporary identifier that has been registered and authenticated by the trusted node 96.

The UE 85 may select another temporary identifier from the updated identifier pool at operation 235 when the need arises to send another registration request to the trusted node 96 at operation 240. The trusted node 96 generates a new temporary identifier $TempID_{N+2}$ while performing registration and authentication of the UE 85, and sends another random challenge for generating the new temporary identifier $TempID_{N+2}$ in a registration response to the UE 85 at operation 245. Having received the new registration response, the UE 85 uses the new random challenge to generate a copy of the new temporary identifier $TempID_{N+2}$ and replaces the newly used temporary identifier (i.e., the temporary identifier selected at operation 235) in its identifier pool with the newly generated temporary identifier $TempID_{N+2}$ at operation 250. Concurrently with operation 250, the trusted node 96 also replaces the used temporary identifier in the pool for the UE 85 with the newly assigned temporary identifier $TempID_{N+2}$ at operation 245. Operation 230 may now resume, the UE 85 now using temporary identifier $TempID_n$ selected at operation 235.

The temporary identifier selected by the UE 85 at operation 235 may possibly be the stored $TempID_{N+1}$ in the identifier pool at operation 220 or may be any other temporary identifier stored in the identifier pool, the selection made at operation 235 being performed in a random fashion. In case the UE 85 only supports one single temporary identifier (i.e. it has a pool of one temporary identifier), the temporary identifier selected at operation 235 is the stored $TempID_{N+1}$ in the identifier pool at operation 220.

Considering the sequence 200 of FIG. 3, it may be observed that a partially trusted CN node having obtained access to the temporary identifier selected by the UE 85 at operation 205 is unable recognize the same UE 85 following the selection of the new temporary identifier at operation 235. It may also be observed that, in an embodiment, the OTI-based registration procedure 200 may be integrated within the 5G UE registration procedure 100 solely by modifying the UE 85 and the UDM 50 acting as the trusted node 96. The various other nodes shown on FIG. 2, which are involved in the 5G UE registration procedure 100, may remain unaware of the fact that the permanent identity of the UE 85 has been replaced with temporary identifies. The OTI-based registration procedure 200 may therefore be implemented without modifying the standard 5G UE registration procedure.

II-B. OTI-Based 5G Registration Procedure

Some embodiments of the present technology may introduce a modification to the 5G registration procedure in order to limit the number of components of the 5G CN 10 that have access to the user permanent identifiers. More specifically, the present technology may restrict the knowledge of the user permanent identifiers to UDM and UDR, given that these are the databases that store information like the SUPI, the long-term key K, and the MNO's private key used to deconceal the SUCI and reconstruct the SUPI.

Figure 4A:
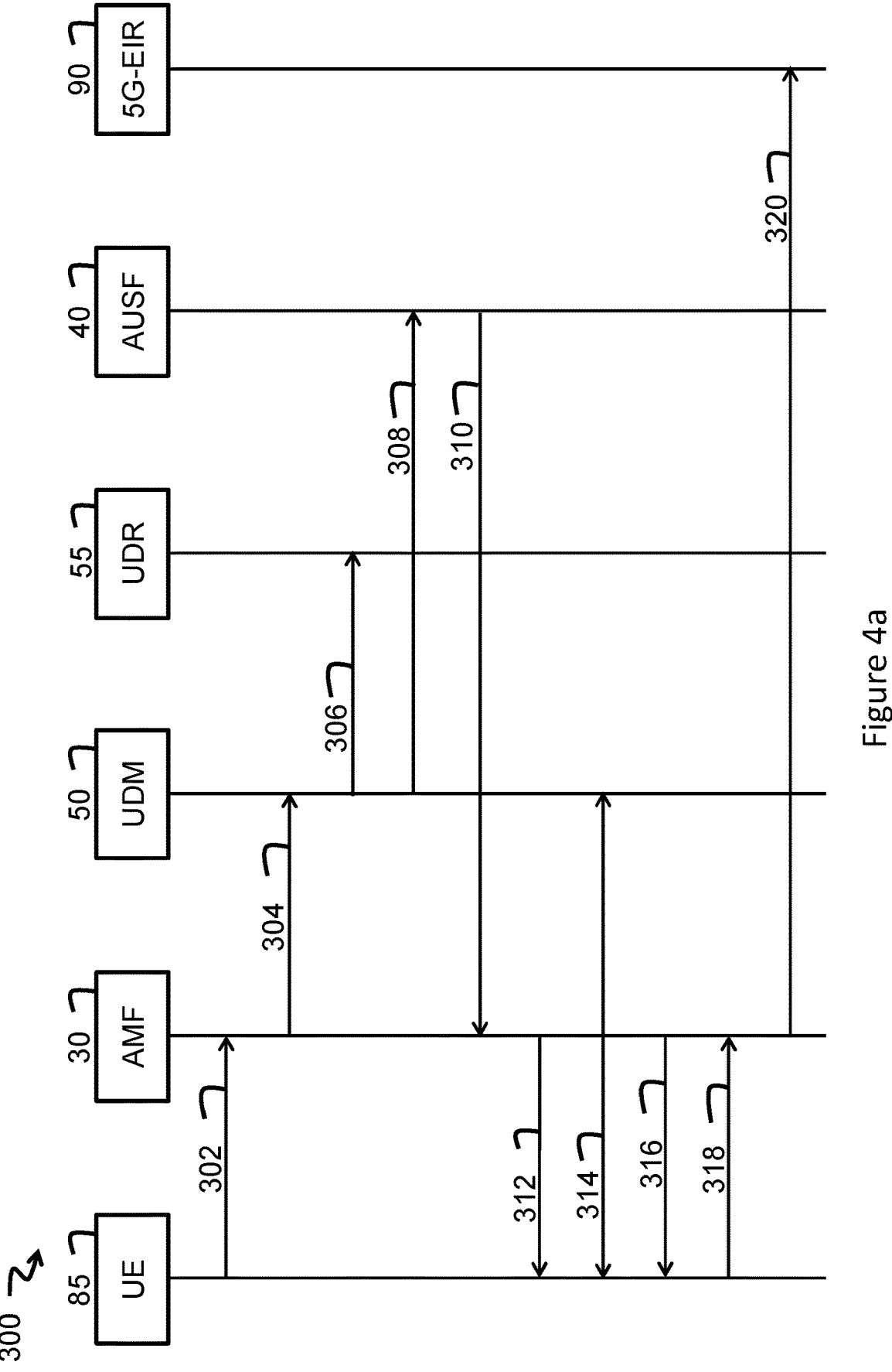
FIGS. 4a and 4b show a modified 5G registration procedure according to an embodiment of the present technology.
Figure 4B:
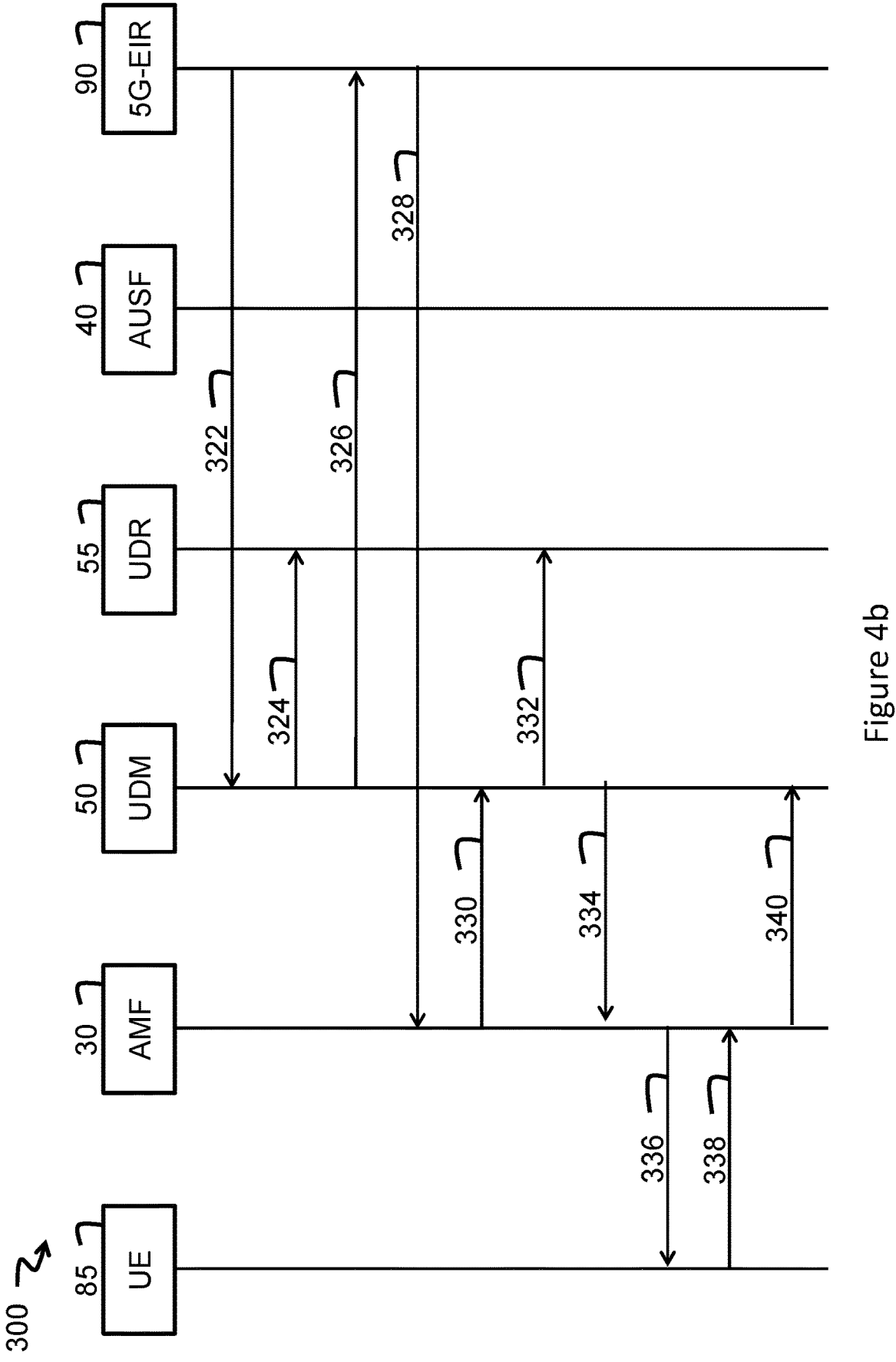

FIGS. 4a and 4b show a modified 5G registration procedure 300 according to an embodiment of the present technology. The order of the various operations of the sequence 300 may differ from the illustration of FIGS. 4a and 4b and some operations may not be present in some embodiments. FIGS. 5a to 5e show subroutines that are part of the modified 5G registration procedure of FIGS. 4a and 4b. Referring to FIGS. 4a, 4b and 5a to 5e, the UE 85 selects a temporary SUPI $(TSUPI_n)$ from its identifier pool and encrypts it with a MNO's public key $pk_{HN}$ to form a temporary SUCI $(TSUCI_n)$. At operation 302, the UE 85 forwards the TSUCI$_n$ in a registration request to the 5G CN 10, in particular to the AMF 30. The AMF 30 forwards the registration request to the UDM 50 at operation 304. Upon reception of the registration request signal carrying TSUCI$_n$, the UDM 50 extracts the TSUPI$_n$ and generates a new TSUPI$_{N+1}$ for the UE 85, the new TSUPI$_{N+1}$ being generated for later use. The new TSUPI$_{N+1}$ may be randomly generated. The UDM 50 updates the UDR 55 with the newly generated TSUPI$_{N+1}$ at operation 306, so that at the end of the sequence 300, both the UDM 50 and the UDR 55 have copies of the identifiers currently assigned to the UE 85.

The conventional 5G registration procedure 100 and the OTI-based registration procedure 200 both include an authentication operation in which the UDM 50 generates an authentication vector (AV) included in the registration response provided to the UE 85. In an aspect of the present technology, the conventional 5G registration procedure 100 may be modified in that the UDM 50 forwards the AV and the TSUPI$_n$ to the AUSF 40 at operation 308. One of the parameters in the AV is a $RAND_{TSUPI_{N+1}}$, which is the random challenge of the above-described operation 215, the random challenge being inserted in a RAND field of the AV.

Figure 5A:
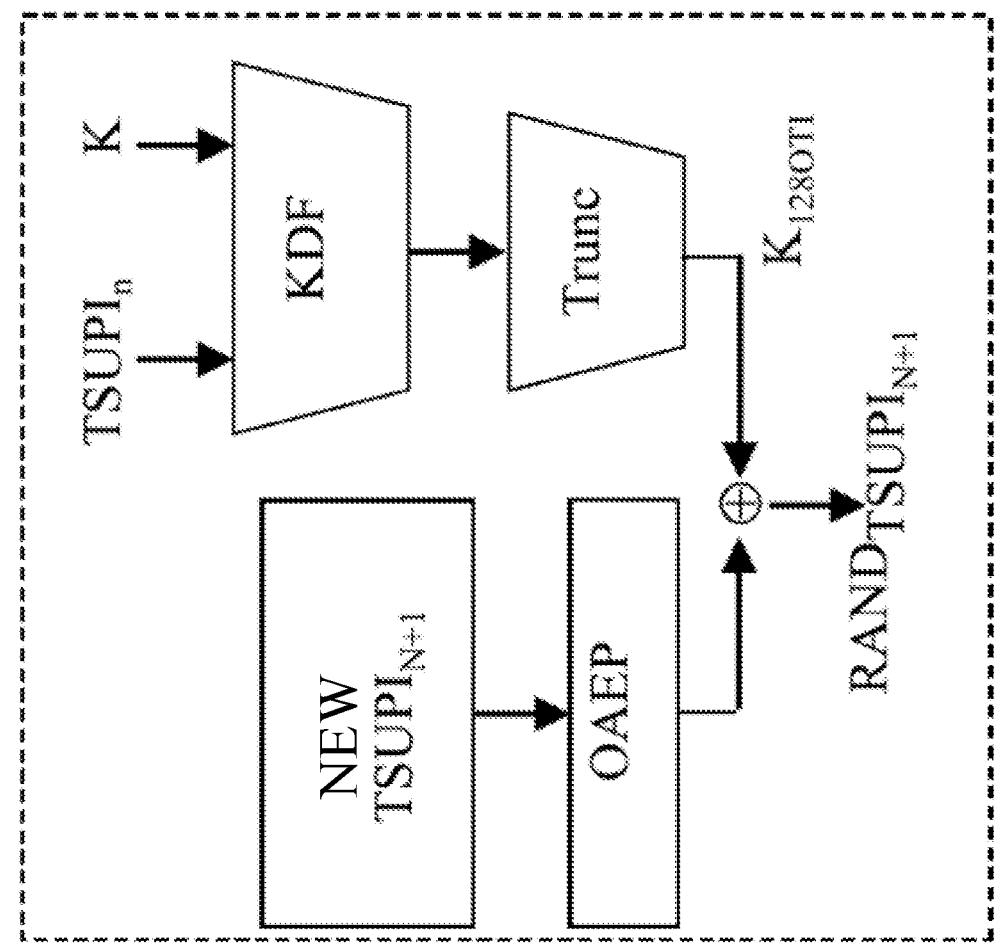
FIGS. 5a to 5e show subroutines that are part of the modified 5G registration procedure of FIGS. 4a and 4b.

FIG. 5a illustrates a non-limiting embodiment for the generation of the $RAND_{TSUPI_{N+1}}$. The random challenge may have a predetermined length, for example a 128-bit length. As used herein, the length of the random challenge is "predetermined" in the sense that it is settled upon in any fashion at some time before being put to use. This task may be accomplished as follows. The UDM 50 uses the long-term key K of the UE 85 and the TSUPI$_n$ received in the registration request from the UE 85 as inputs to a key derivative function (KDF). A resulting first intermediate output of the KDF is truncated, in this example to a 128-bit length, to form a new encryption key $K_{128OTI}$. In an embodiment, the new TSUPI$_{N+1}$ is padded to the same 128-bit length using an optimal asymmetric encryption padding (OAEP) function, thereby forming a second intermediate output. An exclusive OR (XOR) function is then applied to the encryption key $K_{128OTI}$ and to the second intermediate output of the OAEP function to generate the $RAND_{TSUPI_{N+1}}$, as shown in equations (1) and (2) and as illustrated in FIG. 5a.

$$K_{128OTI} \leftarrow \text{Trunc}(\text{KDF}(TSUPI_n, K)) \tag{1}$$

$$RAND_{TSUPI_{N+1}} \leftarrow K_{128OTI} \oplus \text{OAEP(new } TSUPI_{N+1}) \tag{2}$$

In Equation (1), Trunc ($\cdot$) denotes truncating the resulting output to 128 bits, KDF ($\cdot$) is the key derivative function, $\oplus$ denotes the XOR function, and OAEP (·) is the optimal asymmetric encryption padding function that pads the input to be 128 bits.

Figure 5B:
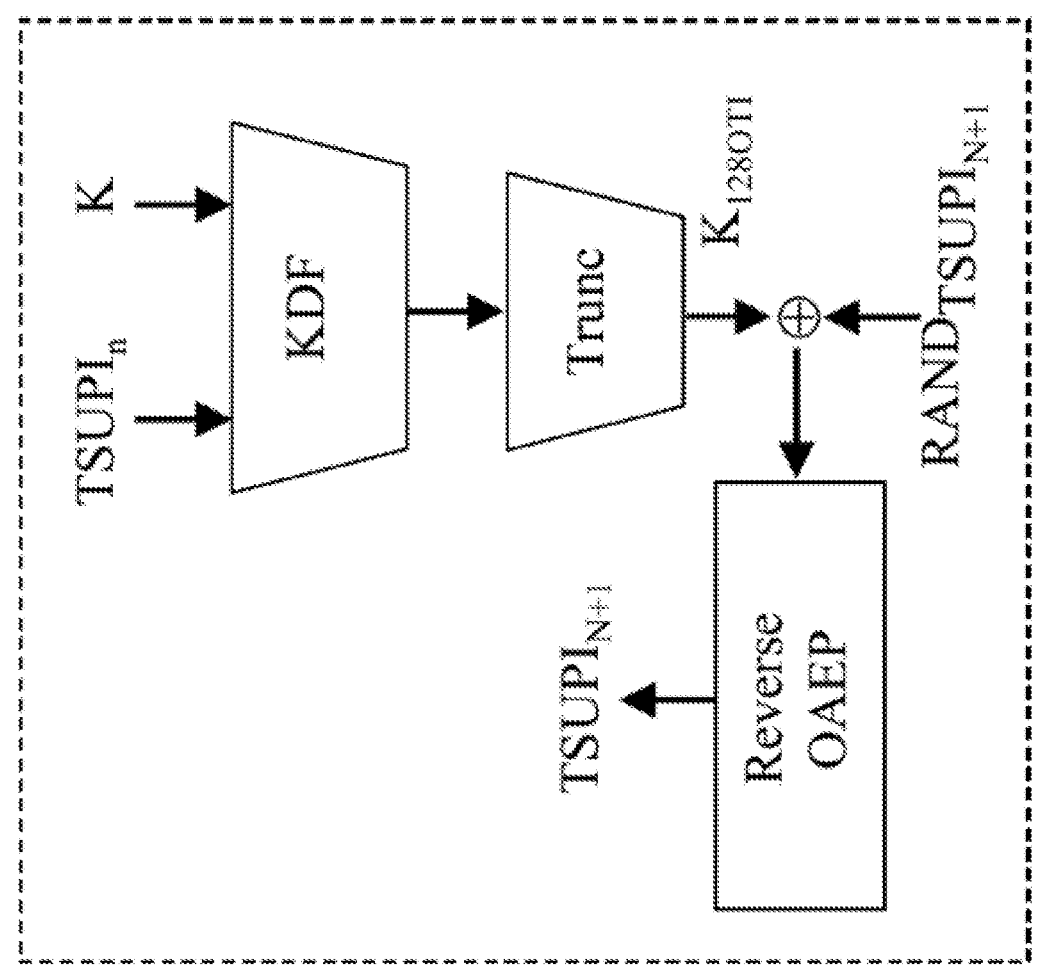
Figure 5D:
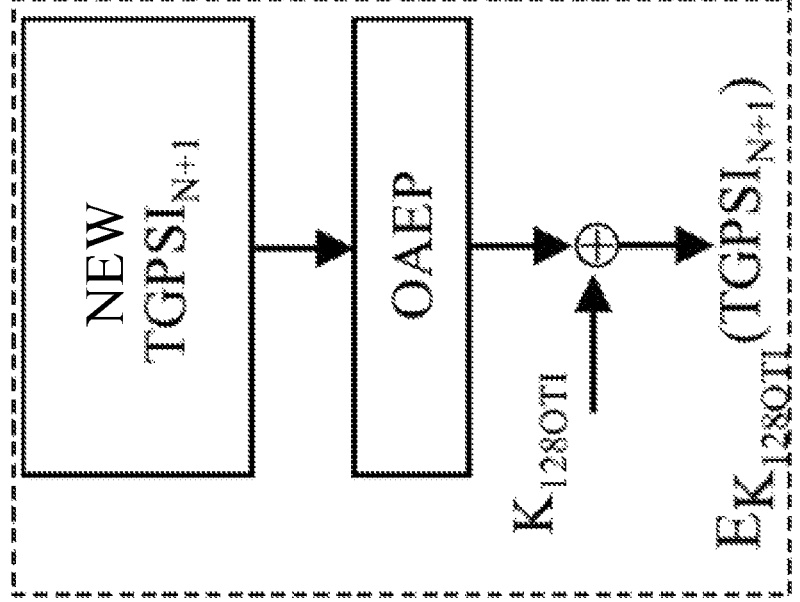
Figure 5C:
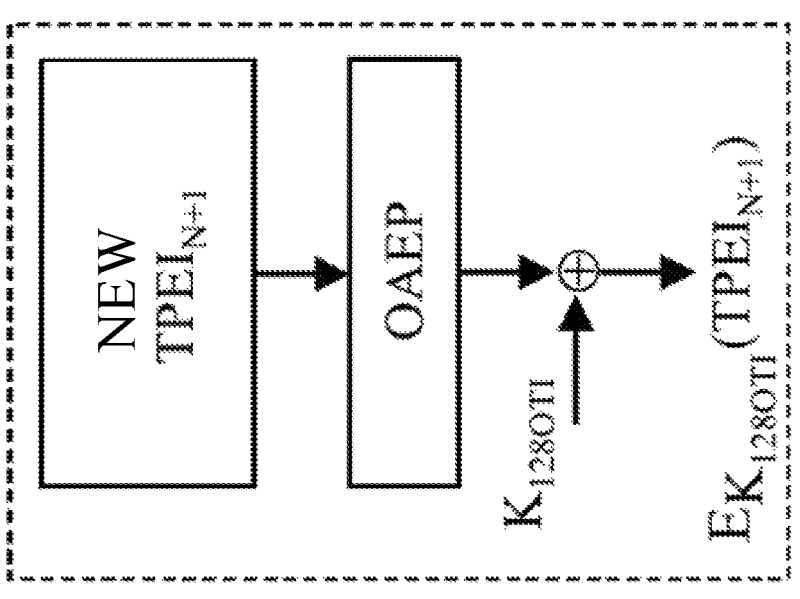
Figure 5E:
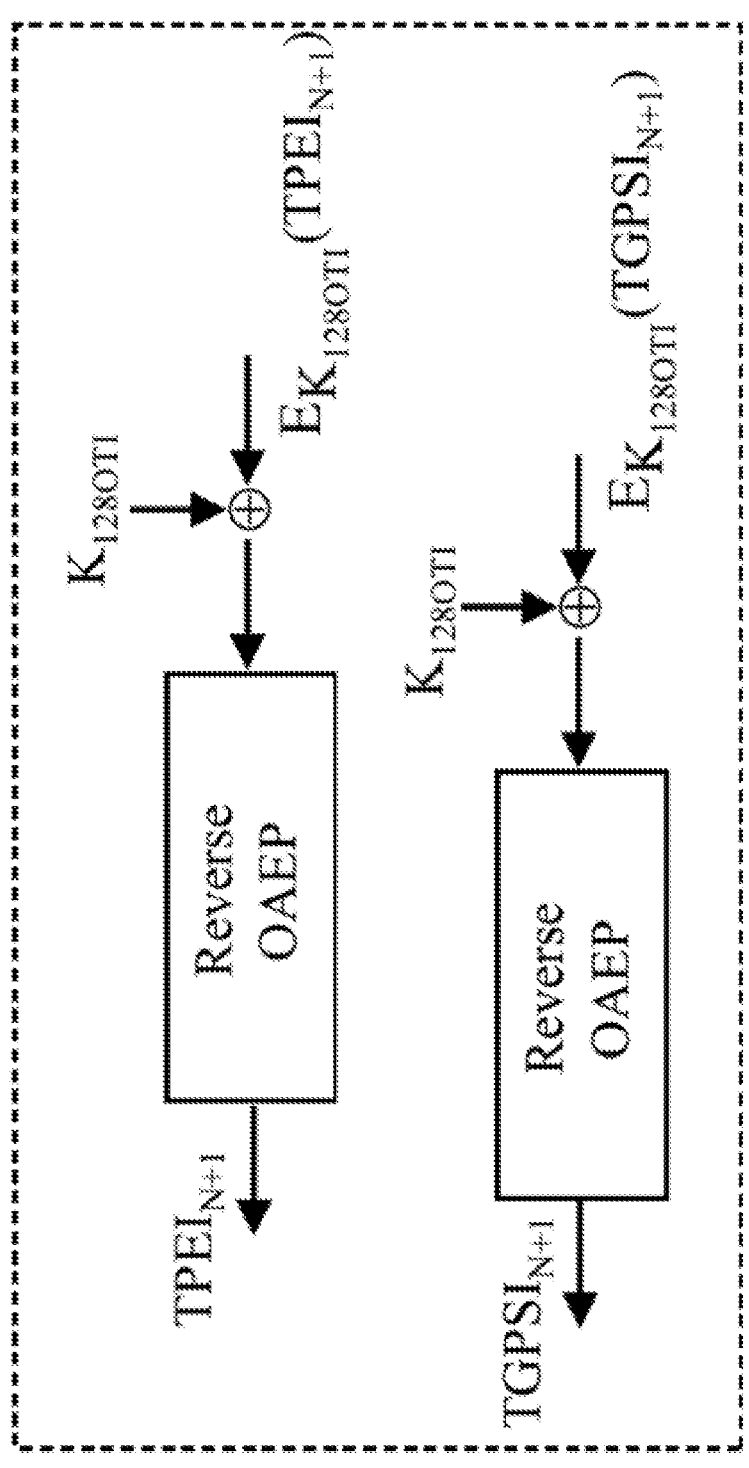

A reverse procedure, illustrated on FIG. 5b, may be used by the UE 85 side to generate the $TSUPI_{N+1}$. The UE 85 may generate the encryption key $K_{128OTI}$ in the same manner as does the UDM 50. In more details, the encryption key $K_{128OTI}$ is generated by inputting, at the UE 85, the $TSUPI_n$ and the long-term key K of the UE 85 into a key derivative function (KDF). A resulting first intermediate output of the KDF is truncated, in this example to a 128-bit length, to form a new encryption key $K_{128OTI}$. The UE 85 then applies an XOR function to the encryption key $K_{128OTI}$ and to the received $RAND_{TSUPI_{N+1}}$ to generate an intermediate output, finally applying a reverse OAEP function on the intermediate output to obtain the $TSUPI_{N+1}$. The $RAND_{TSUPI_{N+1}}$ may thus reach the UE 85, from the UDM 50 and via the AUSF 40 and the AMF 30, in operations 308, 310 and 312. Evidently, although the RAN 80 is not shown on FIG. 4A, signals may reach the UE 85 via the RAN 80. Having received the $TSUPI_{N+1}$, the UE 85 may then update its TSUPI.

Authentication and security verification may take place at operation 314, by use of signaling exchanged between the UE 85 and the UDM 50, for example according to 3GPP 5G specifications as in the case of operation 120 (FIG. 2).

At operation 316, the AMF 30 may request the UE 85 to provide its PEI. Instead of supplying its PEI, the UE 85 may select a temporary PEI ($TPEI_n$), which is sent to the AMF 30 at operation 318. It may be noted that the AMF 30 is not aware that a temporary identifier has been received in response to the request for the PEI of the UE 85. The AMF 30 forwards the $TPEI_n$ to the 5G-EIR 90, as part of an equipment identity verification request, at operation 320. Continuing on FIG. 4b, having verified that the $TPEI_n$ is not blacklisted, the 5G-EIR 90 forwards the received $TPEI_n$ to the UDM 30 at operation 322. The UDM 50 generates a new $TPEI_{N+1}$, which may be randomly selected, and applies the operation shown on FIG. 5c in order to obtain an $E_{K_{128OTI}}$ ($TPEI_{N+1}$), which is an encrypted version of the $TPEI_{N+1}$. As in the case of operation 306, the UDM 50 updates the UDR 55 with the newly generated $TPEI_{N+1}$ at operation 324. Then at operation 326, the UDM 50 forwards the $TPEI_{N+1}$ and its encrypted version to the 5G-EIR 90. In turn, the 5G-EIR 90 stores $TPEI_{N+1}$ and forwards its encrypted version, as well as a possible equipment identity check result, to the AMF 30 at operation 328. As such, the next time an equipment identity check is requested from the 5G-EIR 90 with $TPEI_{N+1}$, the 5G-EIR 90 recognizes the $TPEI_{N+1}$. In case a pool of multiple identifiers is employed, the 5G-EIR 90 may maintain a pool of the temporary TPEIs assigned to the UE 85.

In the course of the modified 5G registration procedure 300, the AMF 30 may send a request, at operation 330, to obtain from the UDM 50 access and mobility subscription data for the UE 85. This request sent by the AMF 30 carries the $TSUPI_n$ that, in fact, is the same as the $TSUPI_{N+1}$ received from the AUSF 40 at operation 310. Having received this request, the UDM 50 generates a new $TGPSI_{N+1}$, which may be randomly generated, and applies the operation shown on FIG. 5d in order to obtain an $E_{K_{128OTI}}$ ($TGPSI_{N+1}$), which is an encrypted version of the new $TGPSI_{N+1}$. The UDM 50 updates the UDR 55 with the new $TGPSI_{N+1}$ at operation 332. The UDM 50 then forwards a current $TGPSI_n$ together with the encrypted version $E_{K_{128OTI}}$ ($TGPSI_{N+1}$) of the new $TGPSI_{N+}$ to the AMF 30 at operation 334, as a response to the request for access and mobility subscription data. The AMF 30 forwards the encrypted $E_{K_{128OTI}}$($TPEI_{N+1}$) and the encrypted $E_{K_{128OTI}}$($TGPSI_{N+1}$) to the UE 85 in a registration accept message sent at operation 336. The UE 85 may use the subroutines shown on FIG. 5e to decrypt the received $E_{K_{128OTI}}$($TPEI_{N+1}$) and $E_{K_{128OTI}}$ ($TGPSI_{N+1}$) and thus extract the new $TPEI_{N+1}$ and $TGPSI_{N+1}$ in view of updating the corresponding temporary identifier pools.

Finally, the UE 85 may send a registration complete signal to the AMF 30 at operation 338, acknowledging the receipt of the new temporary identifiers. In this signal, the "Registration Complete Message Identity" field, which is 8 bits in length, may be used to indicate a registration complete message and convey the $OTI_{ACK}$ parameter, illustrated in FIG. 6, which shows a format of an $OTI_{ACK}$ parameter sent in the registration complete signal. The "Registration Complete Message Identity" field in the existing 3GPP specifications takes the value "01000011". Other mobility management messages are defined in the 5G 3GPP specifications and take the values from "01000001" to "01101000". The $OTI_{ACK}$ parameter is defined starting from "01101001". Depending on the value of bits 1 to 5 in this parameter, the UE 85 may indicate a registration complete message and acknowledge the successful receipt of each individual temporary identifier at the same time. For example a binary value "01101001" (decimal 105) may indicate a registration complete signal with no temporary identifier has been received. A binary value "01110000" (decimal 112) may indicate a registration complete signal, the $TSUPI_{N+1}$, the $TGPSI_{N+1}$ and the $TPEI_{N+1}$ having all been properly received. The AMF 30 then forwards the registration complete signal to the UDM 50 at operation 340 to confirm that the UE 85 has received the new temporary identifiers. In an embodiment, the registration complete signal may be implemented as a Nudm_SDM_Info signal sent on the service-based interface 25 (FIG. 1). At the end of the sequence 300, both the UE 85 and the UDM 50 have synchronized identifier pools. As shown in operations 306, 324 and 332, throughout the sequence 300, the UDM 50 updates the UDR 55 with the newly assigned temporary identifiers, so that at the end, both the UDM 50 and the UDR 55 have a shared knowledge of the temporary identifiers currently assigned to the UE 85.

Considering FIGS. 4a and 4b as a whole, operations 302 to 314 may be understood as providing 5G-AKA SUPI protection features. Operations 316 to 328 may be understood as providing PEI protection features. Operations 330 to 340 may be understood as providing GPSI protection features.

It should be noted that, according to 3GPP 5G specifications, the UE 85 may initiate a 5G registration procedure using the following types: Initial Registration, Mobility Registration Update (due to user mobility or due to a need for the user to update its protocol parameters or to request a change of the set of network slices a user is allowed to use), and Periodic Registration (due to a Periodic Registration Update timer expiry). The modified 5G registration procedure 300 is used at the time of Initial Registration. Signaling flow modifications related to the OTI-based Mobility Registration Update, are described in section IV below. As for Periodic Registration, the complete sequence 300 is not executed between the UE 85 and the 5G CN 10. Hence, for the Periodic Registration procedure, the UE 85 simply identifies itself to the nodes of the 5G CN 10 using the temporary identifiers that have been set at the time of Initial Registration.

II-B.1) Loss of Synchronization Issue:

A possible scenario that might take place in the OTI-based registration protocol is that after the UE 85 sends its registration complete message to the AMF 30, the AMF 30 may fail to deliver this message to the UDM 50, for example due to link errors or outages. In such cases, the UE 85 may wrongly determine that it acknowledged to the 5G CN 10 that it successfully received the temporary identifiers and updated its identifier pool. Meanwhile, since the UDM 50 may not have received the registration complete message, it may also wrongly determine that the UE 85 has not received the temporary identifiers successfully. Hence, in this scenario, the UDM 50 may not update the identifier pool with the new temporary identifiers. Another possible scenario may take place when the UE 85 fails to receive an acknowledgment from the AMF 30 that it has received the registration complete message. Hence, the UE 85 may not update its identifier pool with the new temporary identifiers. In the meantime, the AMF 30 may forward the registration complete message to the UDM 50. Therefore, the UDM 50 may update the identifier pool based on an incorrect determination that the UE 85 has received the temporary identifiers successfully.

Although the above problematic scenarios may seldom occur, they may lead to a mismatch between the two identifier pools at the UE 85 and at the UDM 50. In an embodiment where the UE 85 uses a single temporary identifier, rather than a pool of temporary identifiers, it may fail to register with the 5G CN 10 next time, when attempting to initiate the modified 5G registration procedure 300. This is because the components of the 5G CN 10 may not recognize the temporary identifier sent by the UE 85 in its registration request message. In contrast, in an embodiment where the UE 85 uses a pool of temporary identifiers, if it fails to register with one particular temporary identifier, for example when no successful registration response is received after a predetermined time delay, it may retry initiating the modified 5G registration procedure 300 with another temporary identifier from the identifier pool.

II-B.2) User Traceability Issue:

It is desired, while protecting the user long term identifiers, to prevent an untrusted CN component, for example a compromised AMF 30, from deducing that two different temporary identifiers belong to the same user. Otherwise, an untrusted CN component might run a traceability attack on a user. Due to the nature of the present OTI technology, temporary identifiers such as the TSUPI, TGPSI, and TPEI cannot be used for traceability attacks because they constantly change. However, the 5G-GUTI is another temporary identifier that, if used by the UE 85 for a long period of time, may be used in traceability attacks. According to 3GPP 5G specifications, the purpose of the 5G-GUTI is to provide an identification for the UE 85 that does not reveal the long-term identifiers of the UE 85 to the 5G CN 10. The 5G-GUTI is composed of two parts: one part which identifies the AMF 30 having allocated the 5G-GUTI, and another part that uniquely identifies the UE 85 within the AMF 30. To prevent an untrusted CN component, for example a compromised AMF 30, from tracing the UE 85 by use of the 5G-GUTI, the present OTI technology may prevent the UE 85 from providing its 5G-GUTI in the Registration Request signal. Instead, the UE 85 may identify itself by $TSUCI_n$. This modification to the Registration Request signal complies with 3GPP 5G specifications. At the end of the user registration procedure, the AMF 30 may allocate a new 5G-GUTI to the UE 85 in the registration accept message. Hence, an untrusted CN component is unable to trace the UE 85 using its 5G-GUTI.

It may be noted that 3GPP 5G specifications have considered proposing proprietary protection schemes for 5G vendors. The protection scheme for concealing SUPI in 3GPP 5G specifications for Security architecture and procedures for 5G is determined by identifiers 0x0, 0x1, and 0x2 for supporting the null-scheme, profile A, and profile B, respectively. Moreover, identifiers 0xC-0xF are reserved for proprietary protection schemes. Hence, an embodiment of the present technology may use an identifier 0xC to integrate the modified 5G registration procedure 300 to the existing 5G signals.

II-C. Change Identifier Routine (CIR)

This section describes a routine that a UE may follow to trigger OTI-based registration in order to change its identifiers. This routine is referred to as change identifier routine (CIR) and is applicable only to Initial Registration procedure. CIR is an emulation for re-registering the UE to CN the without engaging the user, i.e. the mobile device is not actually switched off. In fact, by following CIR, the UE receives a new temporary identifier and changes its identity. CIR may be executed using the two following steps:

1. De-Registration Operation:

A UE may send a deregistration request signal to AMF using its 5G-GUTI. In this signal, the UE indicates that the type of de-registration is "switchoff". As a result of sending that signal, the PDU sessions, IP addresses, resources, and contexts that belong to the user are released.

2. Initial Registration Operation:

After the de-registration request operation is performed, and rather than actually switching off, the UE initiates an OTI-based Initial registration procedure. The UE picks up a new identifier $TSUPI_{n+1}$, forms $TSUCI_{n+1}$, and uses it to send a Registration Request signal to AMF. The procedure then continues as described earlier. Once the OTI-based Initial registration procedure is done, the UE applications may re-establish its sessions.

Initiating CIR very frequently improves user privacy as it allows the UE to constantly change its identifiers. However, this may create a huge burden on the 5G CN if a lot of UEs frequently initiate CIR procedures. This suggests that the actual frequency with which the CIR procedure is triggered may be carefully optimized to give a compromise between user security and privacy and the load on the 5G CN. In other words, the frequency of CIR initiation may be a function of the user profile and settings. For example and without limitation, the UE operating system may choose to have the CIR initiated after midnight when the user is asleep and not using his/her mobile device. Alternatively or in addition, the frequency of CIR initiation may be a function of the 5G CN signaling load. The determination of the optimal frequency of CIR initiation may be formulated as an optimization problem. The solution methodology for such problem may depend upon the formulation of the objective function and the type of decision variables and constraints used in the problem. Furthermore, how often the optimization problem needs to be solved and whether a solution is needed in real-time or offline may impact the chosen solution methodology.

III. Feasibility of the Disclosed Oti Scheme and its Formal Verification

III-A. Seamless Operation of the 5G Services

In an embodiment, the present OTI scheme maintains the seamless operation of various 5G services. 5G services and procedures may still work without disruption when using the dynamic temporary identifiers of the present technology. In an embodiment, the UDM 50 and the UDR 55 maintain the same set of the temporary identifiers as does the UE 85 in order to facilitate the integration of the present technology in the 5G services and procedures. The following paragraphs provide an example of some 5G services and how they may still operate while using the temporary identifiers.

Figure 7:
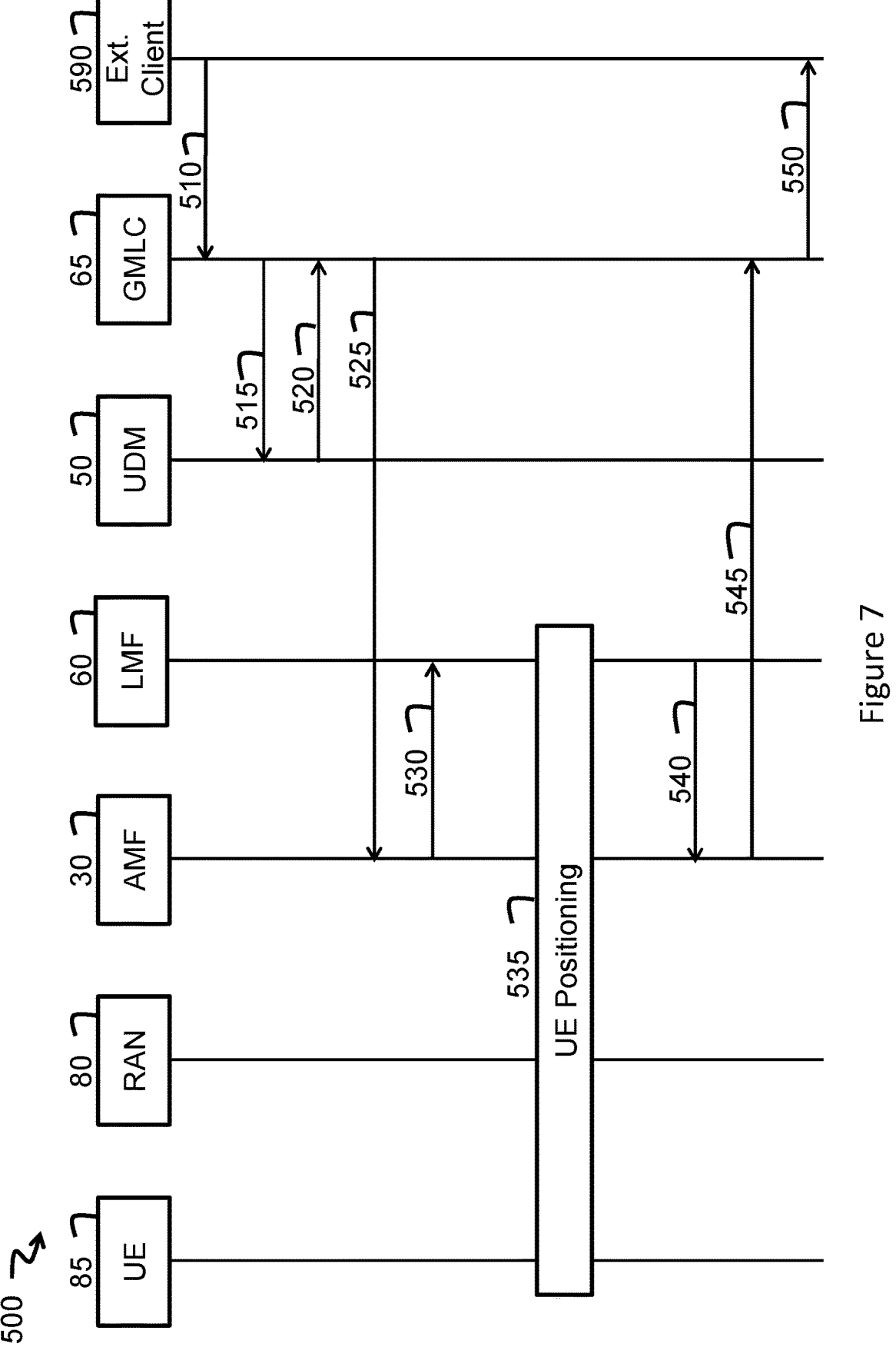
FIG. 7 shows a general procedure for determining the location of a user upon the request of an external location services (LCS) client who is authorized to use the service according to an embodiment of the present technology.

III-A.1) Location Services:

FIG. 7 shows a general procedure 500 for determining the location of a user upon the request of an external location services (LCS) client who is authorized to use the service according to an embodiment of the present technology. The order of the various operations of the sequence 500 may differ from the illustration of FIG. 7 and some operations may not be present in some embodiments. The procedure starts when an external LCS client 590 sends, at operation 510, a request to the GMLC 65 (introduced in the description of FIG. 1) to determine the location of a specific UE 85 identified by either its SUPI or GPSI. The GMLC 65 forwards the request to the UDM 50 at operation 515. The UDM 50 may respond to the GMLC 65 at operation 520 with the network address of the AMF 30 that is currently serving the UE 85. In this operation 520, the UDM 50 may instruct the GMLC 65 to proceed with the procedure 500 using the temporary identifiers (TSUPI$_n$ and TGPSI$_n$) currently assigned to the UE 85. At operation 525, the GMLC 65 sends a request to the AMF 30 to request the current location of the UE 85, this request being sent using the TSUPI$_n$ for the UE 85. The user location determination procedure continues substantially according to 3GPP 5G specifications. As such, at operation 530, the AMF 30 may send a location request for the UE 85 to the LMF 60 (see FIG. 1), the location request carrying the TSUPI$_n$ for the UE 85. After that, a conventional 3GPP 5G UE positioning procedure takes place over an access network, for example over the RAN 80, between the AMF 30 and the UE 85 at operation 535. Thereafter, at operation 540, the LMF 60 returns the current location of the UE 85 to the AMF 30. The AMF 30 forwards a location response to the GMLC at operation 545, and the GMLC forwards the location information for the UE 85 to the external client 590 at operation 550.

As shown in FIG. 7, the location information for the UE 85 may be obtained using its temporary identifiers. Again, this is possible due to the fact that UDM is aware of any temporary identifier currently assigned to the UE 85.

III-A.2) Charging and Billing Services:

According to the 3GPP 5G specifications, 5G networks employ a converged charging system (CCS) 95 which combines two charging mechanisms: offline and online charging. In offline charging, charging information for a user's network resource usage is gathered at the same time of the resource usage. This charging information is then put in the form of charging data records (CDRs). These CDRs are intended to be later sent to a billing domain for the generation and handling of a user billing process. With OTI-based registration, CDRs in the billing domain for the same user might end up carrying different UE identifiers, including temporary identifiers. As expressed hereinabove, the UDM 50 and the UDR 55 maintain records with the set of temporary identifiers assigned to the users. The records maintained in the UDM 50 and the UDR 55 also contain the time of assignment of the temporary identifiers. Thus, the billing domain may interact with the UDM 50 and with the UDR 55 to assign CDRs with different identifiers to their appropriate users and their respective UEs 85. Therefore, the billing domain becomes able to find the temporary identifiers of a user, for example at the time of bill generation. On the other hand, some online charging mechanism employ quota management, in which a user may have a pre-configured quota in CCS 95. In such cases, before granting a user access to a network resource, an authorization may need to be obtained from CCS 95. Since the request may use temporary identifiers, a CCS 95 may issue a request to the UDR 55 to resolve a certain temporary identifier to a previous one and find the right user quota. Once the user uses the network resource, CCS 95 subtracts the amount of resources consumed from the user's available quota in real-time. Therefore, for online charging, CCS 95 may recognize different temporary identifiers of a user without revealing the user's permanent identifier.

Figure 8A:
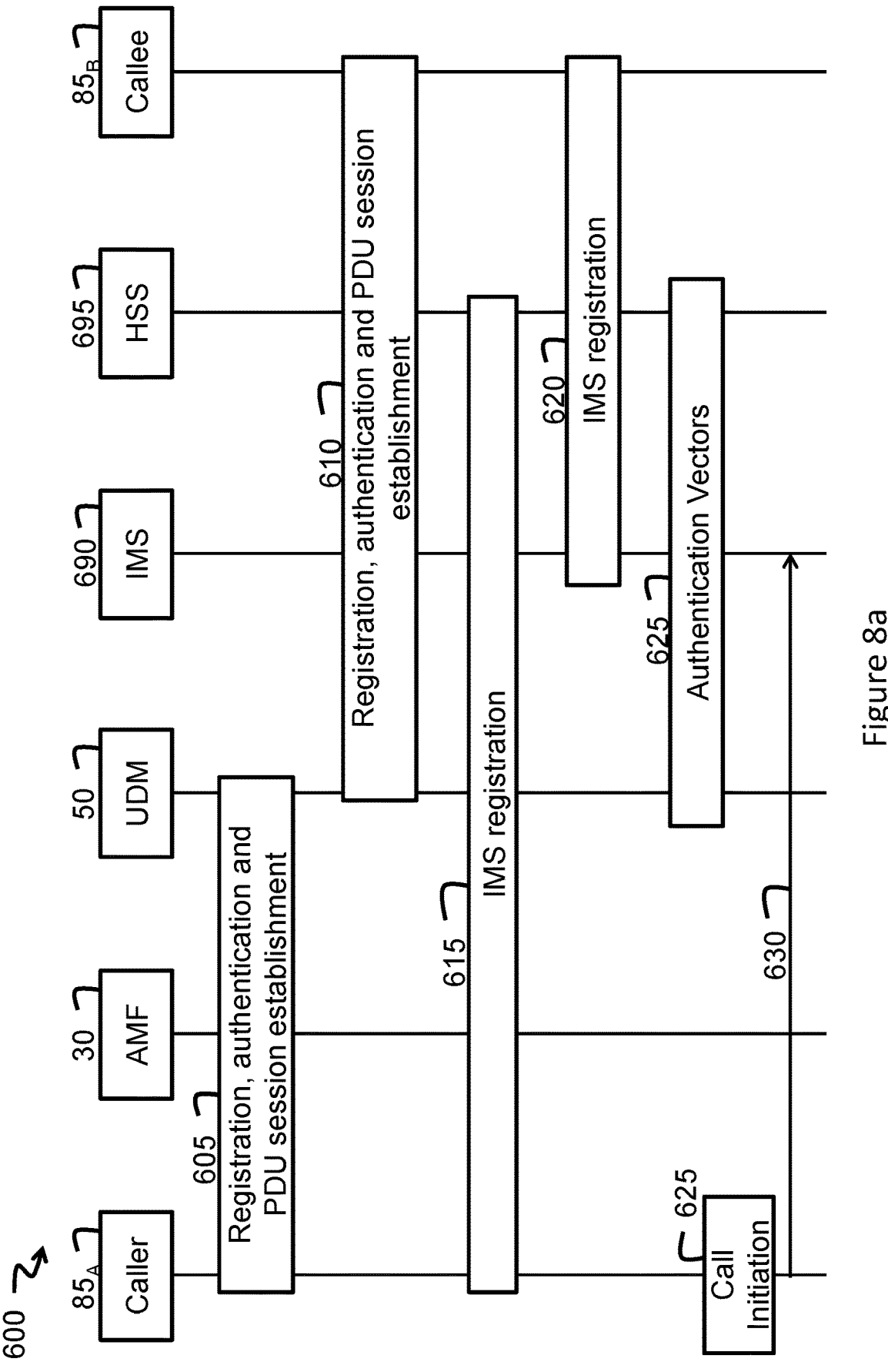
FIGS. 8a and 8b show a general procedure to establish a voice over 5G call between two parties using IP multimedia subsystem (IMS) according to an embodiment of the present technology.
Figure 8B:
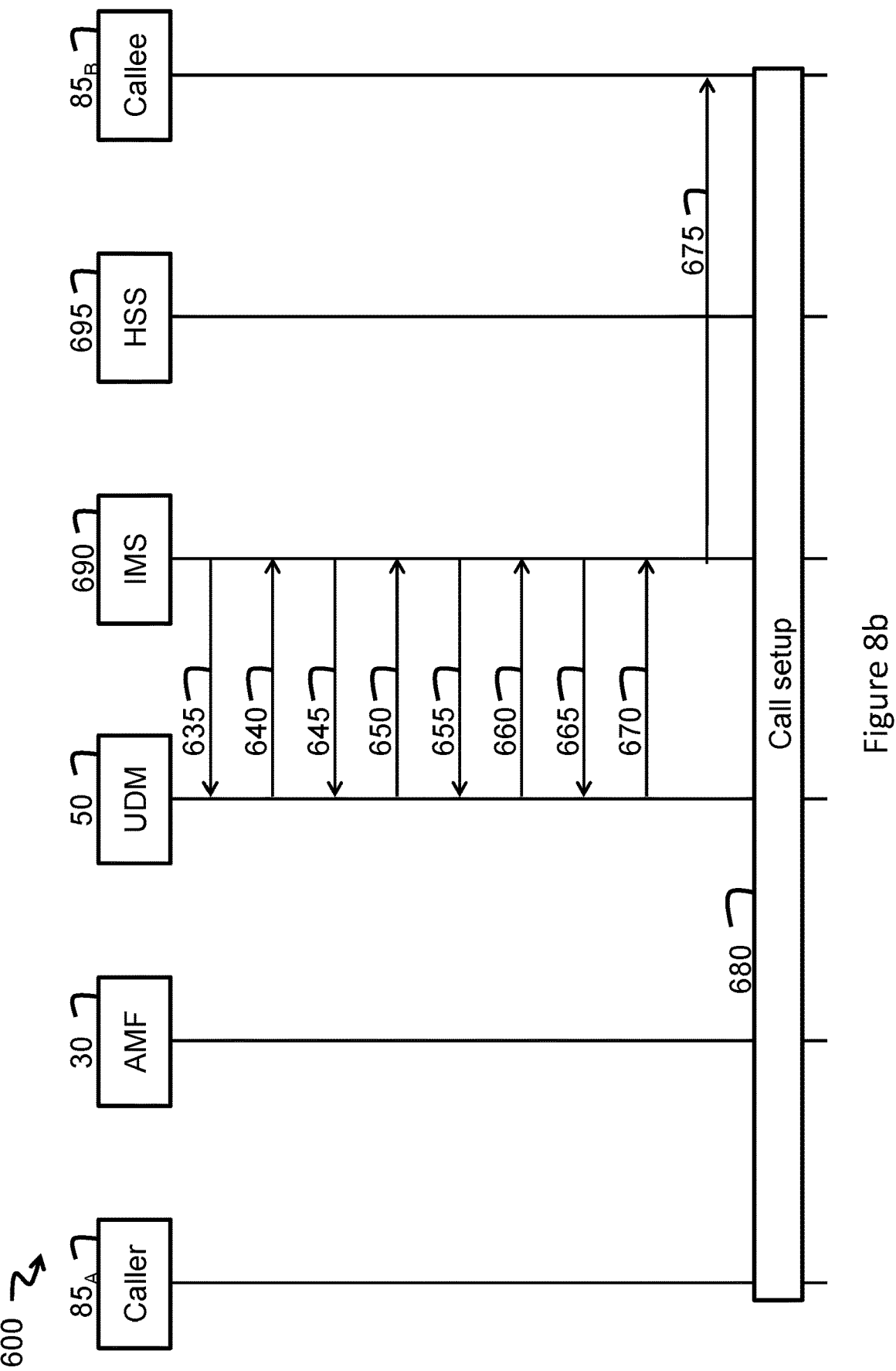

III-A.3) Call Establishment:

FIGS. 8a and 8b show a general procedure 600 to establish a voice over 5G call between two parties using the IMS 690 according to an embodiment of the present technology. The order of the various operations of the sequence 600 may differ from the illustration of FIGS. 8a and 8b and some operations may not be present in some embodiments. Both parties are 5G users, in which the UE 85 of a caller is denoted "caller 85$_A$" and the UE 85 of a callee is denoted "callee 85$_B$". At operation 605, caller 85$_A$ initiates the sequence 200 (FIG. 3) or the sequence 300 (FIGS. 4a and 4b) to become registered and authenticated with the 5G CN 10, setting up a PDU session while proxy call session control function (P-CSCF) discovery is performed. Note that, according to 3GPP 5G specifications, P-CSCF is the first contact point for the users of the IMS 690. The P-CSCF acts as a proxy server for the users where all session initiation protocol (SIP) signaling traffic to and from the UEs 85 go through. In the course of operation 605, caller 85$_A$ acquires temporary identifiers TGPSI$_{caller}$ and TSUPI$_{caller}$. Likewise at operation 610, callee 85$_B$ initiates the sequence 200 or the sequence 300 to become registered and authenticated with the 5G CN 10, setting up a PDU session while P-CSCF discovery is performed. In the course of operation 610, callee 85$_B$ acquires temporary identifiers TGPSI$_{callee}$ and TSUPI$_{callee}$.

At operation 615, caller 85$_A$ registers with the IMS 690 and with a home subscriber station (HSS) 695. In an embodiment, caller 85$_A$ may identify itself to the IMS 690 and the HSS 695 using the temporary identifiers TGPSI$_{caller}$ and TSUPI$_{caller}$. Likewise at operation 620, callee 85$_B$ registers with the IMS 690 and with the HSS 695, for example using the temporary identifiers TGPSI$_{callee}$ and TSUPI$_{callee}$. At operation 625, the UDM 50 may generate authentication vectors (see description FIG. 4a, in which an AV is transmitted by the UDM 50 at operation 308), the AVs being sent to the HSS 695 for AKA authentication of caller 85$_A$ and of callee 85$_B$.

At operation 625, the user of the UE designated as caller 85$_A$ may initiate a call providing a number or address of callee 85$_B$ may. Caller 85$_A$ sends at SIP Invite message to the IMS 690 at operation 630, the message carrying the TGPSI$_{caller}$ and a GPSI$_{callee}$. It is observed that caller 85$_A$ is expected to be unaware of any temporary identifier for callee 85$_B$.

Continuing on FIG. 8b, the IMS 690 initiates two sets of signaling exchanges with the UDM 50, one set to resolve the temporary identifier TGPSI$_{caller}$ to the permanent identity GPSI$_{caller}$, for example for caller identity display purposes at the callee 85$_B$, another set of signaling being used to resolve the permanent identity GPSI$_{callee}$ to the temporary identifier TGPSI$_{callee}$, for call routing purposes. Signals are exchanged between the IMS 690 and the UDM 50 to resolve the TGPSI$_{caller}$ to the GPSI$_{caller}$ as follows: the IMS 690 sends the TGPSI$_{caller}$ to the UDM at operation 635, and the UDM 50 responds with the TSUPI$_{caller}$ at operation 640; the IMS 690 sends the TSUPI$_{caller}$ to the UDM 50 at operation 645, and the UDM 50 responds with the GPSI$_{caller}$ at operation 650. Signals are then exchanged between the IMS 690 and the UDM 50 to resolve the GPSI$_{callee}$ to the TGPSI$_{callee}$ as follows: the IMS 690 sends the GPSI$_{callee}$ to the UDM at operation 655, and the UDM 50 responds with the TSUPI$_{callee}$ at operation 660; the IMS 690 sends the TSUPI$_{callee}$ to the UDM 50 at operation 665, and the UDM 50 responds with the TGPSI$_{callee}$ at operation 670. Following operations 635 to 670, the permanent identity of the calling party is available for display on the UE 85 of the called party, and the temporary identifier of the called party may be used to route the call from the caller 85$_A$ to the callee 85$_B$.

At operation 675, the IMS 690 forwards the SIP Invite message to the callee 85$_B$, the SIP invite differing from that of operation 630 in that the TGPSI$_{caller}$ has been replaced with the GPSI$_{caller}$ and the GPSI$_{callee}$ has been replaced with the TGPSI$_{callee}$. Normal call setup may then take place at operation 680 according to standard 5G call establishment procedures.

III. B. Formal Verification of OTI

The following paragraphs present a formal analysis to the present OTI-based 5G-AKA scheme using the Tamarin Prover. An OTI-based 5G-AKA Tamarin model was defined by modifying a conventional 5G-AKA Tamarin model. In the present OTI-based 5G-AKA Tamarin model, the adversary was modeled as a Dolev-Yao adversary, which was deemed able to intercept sent messages, examine their contents, and insert its own messages. Moreover, the present OTI-based 5G-AKA Tamarin model was made to represent the 5G registration procedure of FIGS. 4a and 4b using three network components: the 5G-user, the serving network (taking the role of the AMF 30), and the home network (taking the role of the AUSF 40, the UDM 50, and the UDR 55). In this model, a channel between the user and the serving network was insecure and could be subject to eavesdropping, interception, and manipulation by adversaries. However, a channel between the home and the serving network was deemed to be secure, providing confidentiality, integrity, authenticity, and replay protection. Hence, according to present OTI-based 5G-AKA Tamarin model, the AMF 30 was the CN component with the possibility of being compromised by an adversary.

The secrecy properties of the temporary SUPI identifier TSUPI$_{N+1}$ and of the encryption key K$_{128OTI}$ have been studied using the present OTI-based 5G-AKA Tamarin model. At the end of the run of a protocol, a message X was deemed to have remained secret if an adversary was unable to decode this message. The Tamarin code, available on the Github web site, was modified to provide the following functionalities:

a. the adversary capabilities were enhanced by modeling the possibility of revealing the encryption key K$_{128OTI}$;

b. the generation of the encryption key K$_{128OTI}$ and the subsequent generation of the RAND parameter at UDM side were modelled;

c. a new TSUPI$_{N+1}$, which was a random value, was generated;

d. the generation of the encryption key K$_{128OTI}$ and the extraction of the sent TSUPI$_{N+1}$ at the user side were modelled;

e. sanity checks were added to verify that the code was executable; and f. a restriction was added so that the present OTI-based 5G-AKA Tamarin model considered traces with successful decryption and extraction of the TSUPI$_{N+1}$.

To verify the confidentiality properties of the TSUPI$_{N+1}$ and of the encryption key K$_{128OTI}$, two lemmas were defined, including "tsupi_secrecy" and "K$_{128OTI}$_secrecy", as shown in FIG. 9. Lemma tsupi_secrecy stated that it was not possible for an adversary to know that a user was receiving a new TSUPI$_{N+1}$, whereas, lemma K$_{128OTI}$_secrecy stated that it is not possible for an adversary to know that a user was establishing the encryption key K$_{128OTI}$ with UDM. In both lemmas, it was implied that the TSUPI$_{N+1}$ and the encryption key K$_{128OTI}$ could only be known by the trusted CN components, which were the UDM 50 and the UDR 55 in the simulations, as well by the user. The two lemmas were studied assuming different levels of adversary knowledge. Finally, two additional lemmas "temp_SUPI_state_exists" and "K$_{128OTI}$_state_exists" were specified to verify that the protocol was executable.

Table II presents simulation results obtained using the OTI-based 5G-AKA Tamarin model, showing how the confidentiality of the TSUPI$_{N+1}$ and of the encryption key K$_{128OTI}$ was maintained, or lost, according to various levels of adversary knowledge.

TABLE II

| Row | Adversary Knowledge | Secrecy of TSUPI$_{N+1}$ | Secrecy of K$_{128OTI}$ |
|---|---|---|---|
| 1 | None | Yes | Yes |
| 2 | TSUPI$_n$ only | Yes | Yes |
| 3 | Long-term key K only | Yes | Yes |
| 4 | Both TSUPI$_n$ and Long-term key K | No | No |
| 5 | Encryption key K$_{128OTI}$ | No | N/A |

As expected, when neither the Long-term key K nor the TSUPI$_n$ were compromised (Row 1 in Table II), the secrecy of the TSUPI$_{N+1}$ and the secrecy of the encryption key K$_{128OTI}$ were both maintained, having both remained confidential.

As also expected, when the TSUPI$_n$ and the Long-term key K were both compromised (Row 4), the secrecy of the TSUPI$_{N+1}$ and the secrecy of the encryption key K$_{128OTI}$ were no longer maintained. This result may be explained in that, knowing both the TSUPI$_n$ and the Long-term key K, an adversary might have generated a copy of the encryption key K$_{128OTI}$ and extract a copy of the TSUPI$_{N+1}$ from the RAND parameter, using the procedure shown on FIG. 5b. Similarly, when the encryption key K$_{128OTI}$ was compromised (Row 5), the secrecy of the TSUPI$_{N+1}$ was not maintained.

However, some of the favorable results shown in Table II were initially unexpected: when only one of the TSUPI$_n$ (Row 2) or the Long-term key K (Row 3) were compromised, the secrecy of the TSUPI$_{N+1}$ and the secrecy of the encryption key K$_{128OTI}$ were still maintained.

IV. Session Continuity with OTI

The present section discusses the session and service continuity (SSC) when OTI is applied. A UE normally initiates a registration procedure in 5G using the following types: a) Initial Registration, b) Periodic Registration, and c) Mobility Registration Update. The Initial Registration happens when the UE is going to establish a 5G connection. Periodic Registration happens due to a Periodic Registration Update timer expiry. Mobility Registration Update is due to user mobility and may also happen when a UE needs to update its protocol parameters or request a change in the network slices. Prior to an Initial Registration procedure, there are no established sessions. Moreover, the Periodic Registration procedure does not trigger the authentication procedure that changes the user's identifiers. Hence, the OTI method may not be used with the Periodic Registration procedure. On the other hand, sending the Mobility Registration Update signal may trigger the authentication procedure which results in generating new temporary identifiers by OTI.

Figure 10:
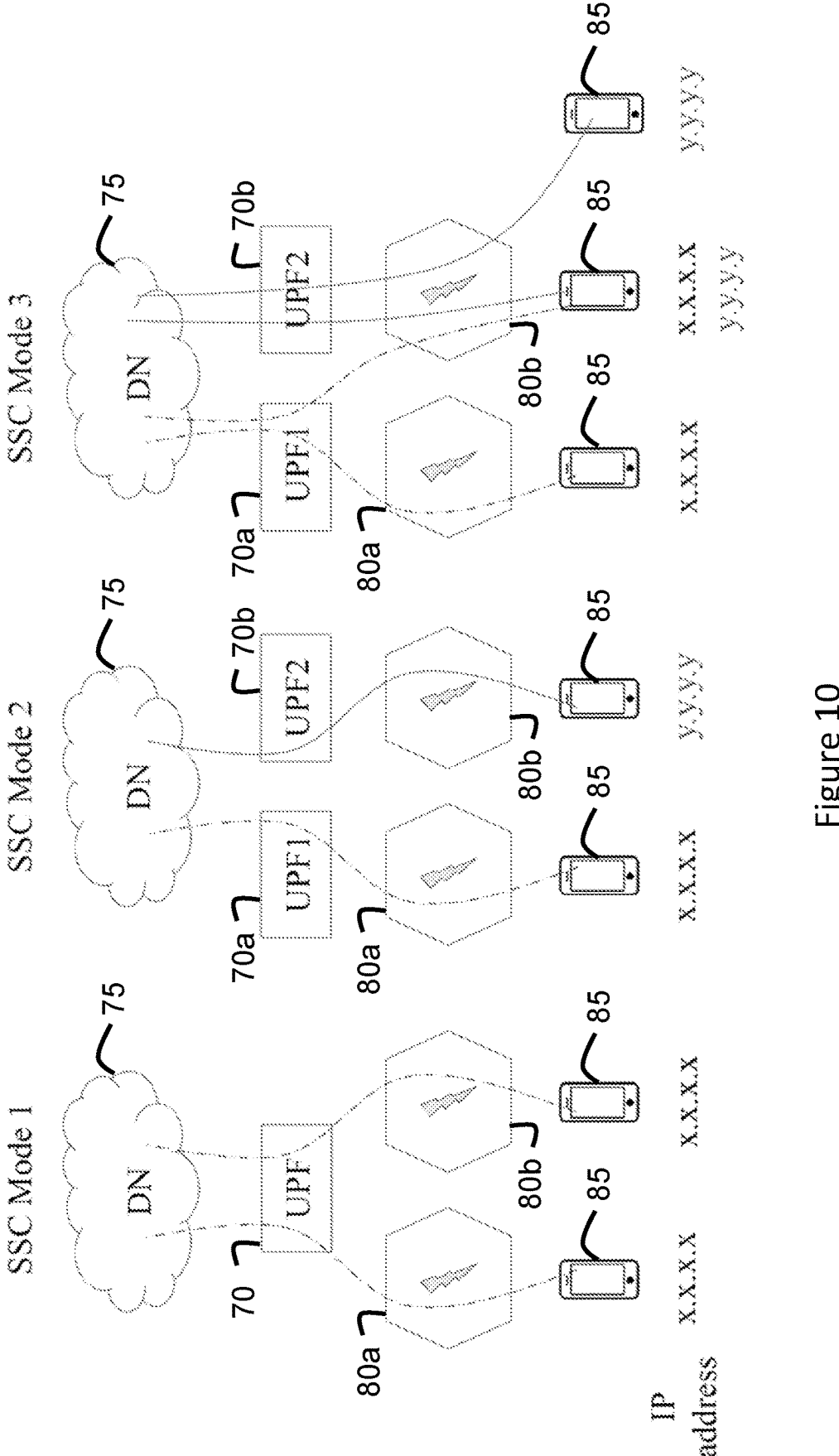
FIG. 10 shows three different SSC modes defined in the 3GPP Specifications.

To provide SSC for various user applications with different requirements, three SSC modes are defined in 3GPP specifications. FIG. 10 shows three different SSC modes defined in the 3GPP Specifications. These modes are called SSC mode 1, SSC mode 2, and SSC mode 3. The effective SSC mode impacts the allocation of a particular UPF 70 to the UE 85 in the course of a PDU session.

In the SSC mode 1, as the UE 85 moves between access networks, for example between RAN 80*a* and RAN 80*b*, it maintains its IP address and remains connected to the 5G CN 10 and to the DN 75 via the same UPF 70. In the SSC mode 2, as the UE 85 moves between the RAN 80*a* and the RAN 80*b*, its old IP address is replaced with a new one and, concurrently, its connection to the DN 75 changes from one UPF 70*a* to another UPF 70*b*. This may involve releasing the PDU session and establishing a new one. The SSC mode 3 uses a "make-before-break" concept for the connection of the UE 85 to the to the DN 70. In a first phase, the UE 85 moves from the RAN 80*a* to the RAN 80*b* while maintaining its connection to the UPF 70*a*. At that time, the UE 85 acquires a new IP address while maintaining its old IP address. Thereafter in a second phase, the connection of the UE 85 is changed to the UPF 70*b* and the UE 85 and the old IP address of the UE 85 is released.

The present disclosure mainly focuses on the SSC mode 2, in which the 5G CN may release a user's ongoing PDU session and then instructs the UE 85 to re-establish a new PDU session to the same DN 75. This process leads to the UE 85 being connected to the same DN 75 through a new UPF 70, using a new IP address.

Figure 11A:
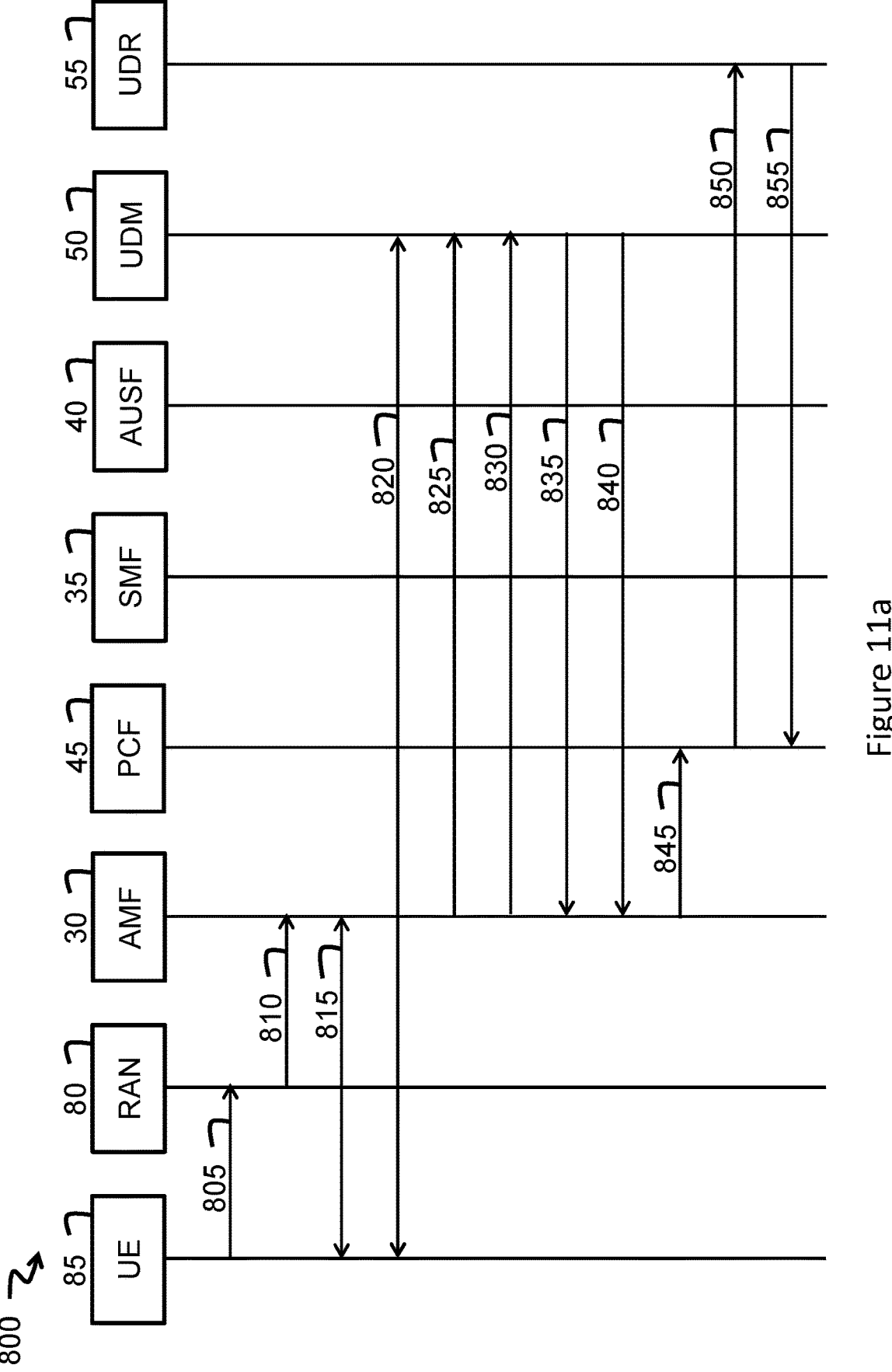
FIGS. 11a and 11b describe a 5G Mobility Registration Update procedure based on OTI according to an embodiment of the present technology.
Figure 11B:
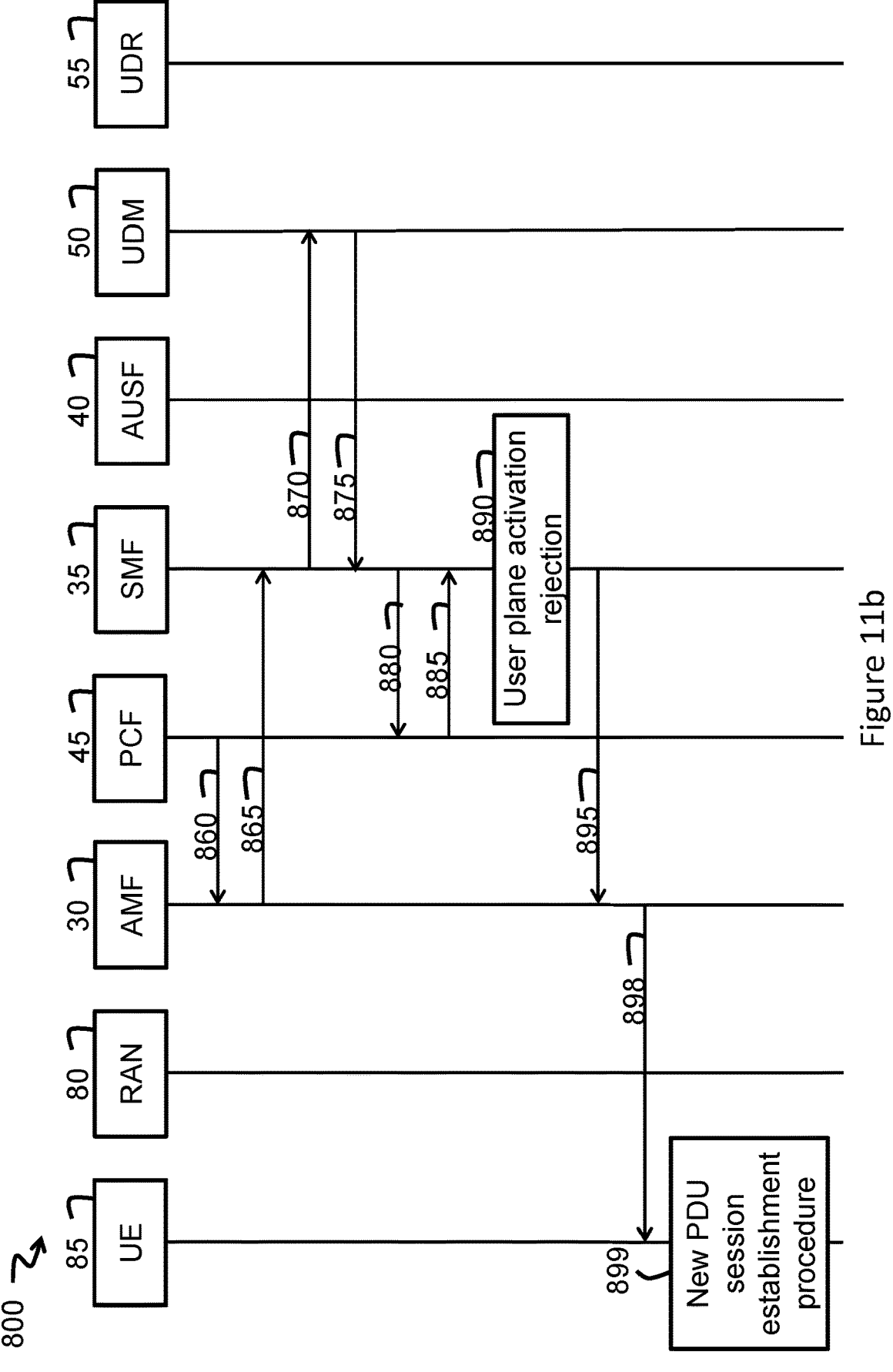

Hence, FIGS. 11*a* and 11*b* describe a 5G Mobility Registration Update procedure based on OTI according to an embodiment of the present technology. In these Figures, the Mobility Registration Update procedure is updated to accommodate OTI. In other words, OTI-based Mobility Registration Update procedure provide the session and service continuity while hiding the user identities and preventing traceability attacks for PDU sessions of the SSC mode 2. The procedure may be summarized as follows:

Operation 805—In 5G, whenever the UE 85 sends out a Mobility Registration Update request to the AMF 30, it includes its 5G-GUTI. However, considering that the AMF 30 is untrusted in OTI, including 5G-GUTI in the Mobility Registration Update as is conventionally done in 5G enables the AMF 30 to run traceability attacks on the UE 85. Therefore, in an embodiment, the UE 85 uses an artificial 5G-GUTI when sending out a Mobility Registration Update signal to the AMF 30. The registration signal also includes a field called "List Of PDU Sessions To Be Activated", which lists all the PDU sessions (identified by PDU Session IDs) with pending uplink data. In an embodiment, this field includes the PDU sessions that are for the SSC mode 2.

Operation 810—The RAN 80, or another access network, selects an AMF 30 and sends it the registration request signal.

Operation 815—Since the AMF 30 is unable to recognize the artificial 5G-GUTI, the AMF 30 sends an identity request signal back to the UE 85. The UE 85 responds with its TSUCIn.

Operation 820—The AMF 30 initiates the authentication procedure for the UE 85. During this operation, the UE 85 gets a new TSUPIN+1.

Operation 825—After a successful authentication, the AMF 30 registers itself to the UDM 50 as the serving AMF 30 for the UE 85.

Operation 830—The AMF 30 realizes that it does not have a valid user context corresponding to the identifier TSUPIn. Hence, the AMF 30 sends a Nudm_SDM_Get request signal to the UDM 50 to fetch the necessary user data to form the user context.

Operation 835—The UDM 50 responds back with the requested subscription data.

Operation 840—In 5G, when a user moves from an old AMF 30 to a new AMF 30, the UDM 50 sends a Nudm_UECM_DeregistrationNotify signal to the old AMF 30 so that the old AMF 30 may delete that user context. In an embodiment, the same technique is sued to prevent an AMF 30 from maintaining two user contexts for the same UE 85, corresponding to the previous identifier TSUPIn−1. It may be noted that the AMF 30 does not know that the two user contexts corresponding to TSUPIn−1 and TSU Operation 845—Through a PCF 45 discovery and selection process, the AMF 30 chooses a PCF 45 and sends it an Npcf AMPolicyControl Create signal to establish an access and mobility (AM) policy control association. In an embodiment, this operation uses a Create signal instead of an Update signal of the current 5G specifications. In this context, "Create" refers to those signals that create new associations (e.g., Npcf AMPolicyControl Create), rather than updating an existing one.

Operation 850—In order to allow the PCF 45 to recognize TSUPIn, the PCF 45 fetches the user policy data from UDR 55 using the Nudr_DataRepository Query request signal.

Operation 855—The UDR 55 replies back to PCF 45 with the requested policy data.

Operation 860—The PCF 45 replies to the AMF 30 by providing the AM related policy information (e.g. service area restrictions). In an embodiment, this operation uses a Create signal instead of an Update signal of the current 5G specifications.

Operation 865—The AMF 30 sends a Nsmf_PDUSession_CreateSMContext request signal to the SMF 35 to create an SM context for the UE 85 at the SMF 35. In an embodiment, this operation also uses a Create signal instead of an Update signal of the current 5G specifications.

Operation 870—The SMF 35 does not have a session management (SM) context for TSUPIn. Hence, the SMF 35 fetches the corresponding session management subscription data from the UDM 50 using a Nudm_SDM Get request signal. Furthermore, the SMF 35 informs the UDM 50 of the SSC mode of the requested PDU sessions.

Operation 875—The UDM 50 responds back to the SMF 35 by providing the necessary session management subscription data without letting the SMF 35 know that TSUPI$_n$ and TSUPIn−1 belong to the same UE 85.

Operation 880—The SMF 35 sends a Npcf_SMPolicyControl Create signal to the PCF 45 to establish an SM policy association with the PCF 45. In an embodiment, this operation also uses a Create signal instead of an Update signal of the current 5G specifications.

Operation 895—The SMF 35 gets a confirmation back from the PCF 45 by the Npcf_SMPolicyControl Create response signal. In an embodiment, this operation also uses a Create signal instead of an Update signal of the current 5G specifications.

Operation 890—At this point, the SMF 35 rejects the activation of the UP connections for the SSC mode 2 PDU sessions.

Operation 895—The SMF 35 then replies back to the AMF 30 by sending a Nsmf_PDUSession CreateSMContext response indicating that it has rejected the activation of user plane (UP) connections for the SSC mode 2 PDU sessions. The SMF 35 also indicates that a PDU session re-establishment is needed. In an embodiment, this operation also uses a Create signal instead of an Update signal of the current 5G specifications.

Operation 898—According to current 5G specifications, the AMF 30 sends a registration accept signal to the UE 85 with a newly assigned 5G-GUTI and the new $TPEI_{N+1}$ and $TGPSI_{N+1}$ as described earlier. Moreover, the AMF 30 informs the UE 85 of the PDU Session IDs for which the UP resources were not activated and the reason, which the UE 85 understands as an indication that PDU session re-establishment is needed.

Operation 899—The UE 85 then generates a new PDU Session ID and initiates PDU session establishment procedure to the same DN 75.

Given the present sequence 800, the UE 85 has obtained new temporary identifiers and re-established a new PDU sessions to the same DN 75. In addition, the SMF 35 has remained unable to realize that the current $TSUPI_n$ and the previous $TSUPI_{n-1}$ belong to the same UE 85. According to this sequence 800, SMF 35 and PCF 45 may be kept as untrusted CN components.

It will be appreciated that at least some of the operations of the sequences 100, 200, 300, 500, 600 and 800 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It is to be understood that the operations and functionality of the described UE 85 and of the components of the 5G CN 10, their constituent components, and associated processes may be achieved by any one or more of hardware-based, software-based, and firmware-based elements. Such operational alternatives do not, in any way, limit the scope of the present disclosure.

Figure 12:
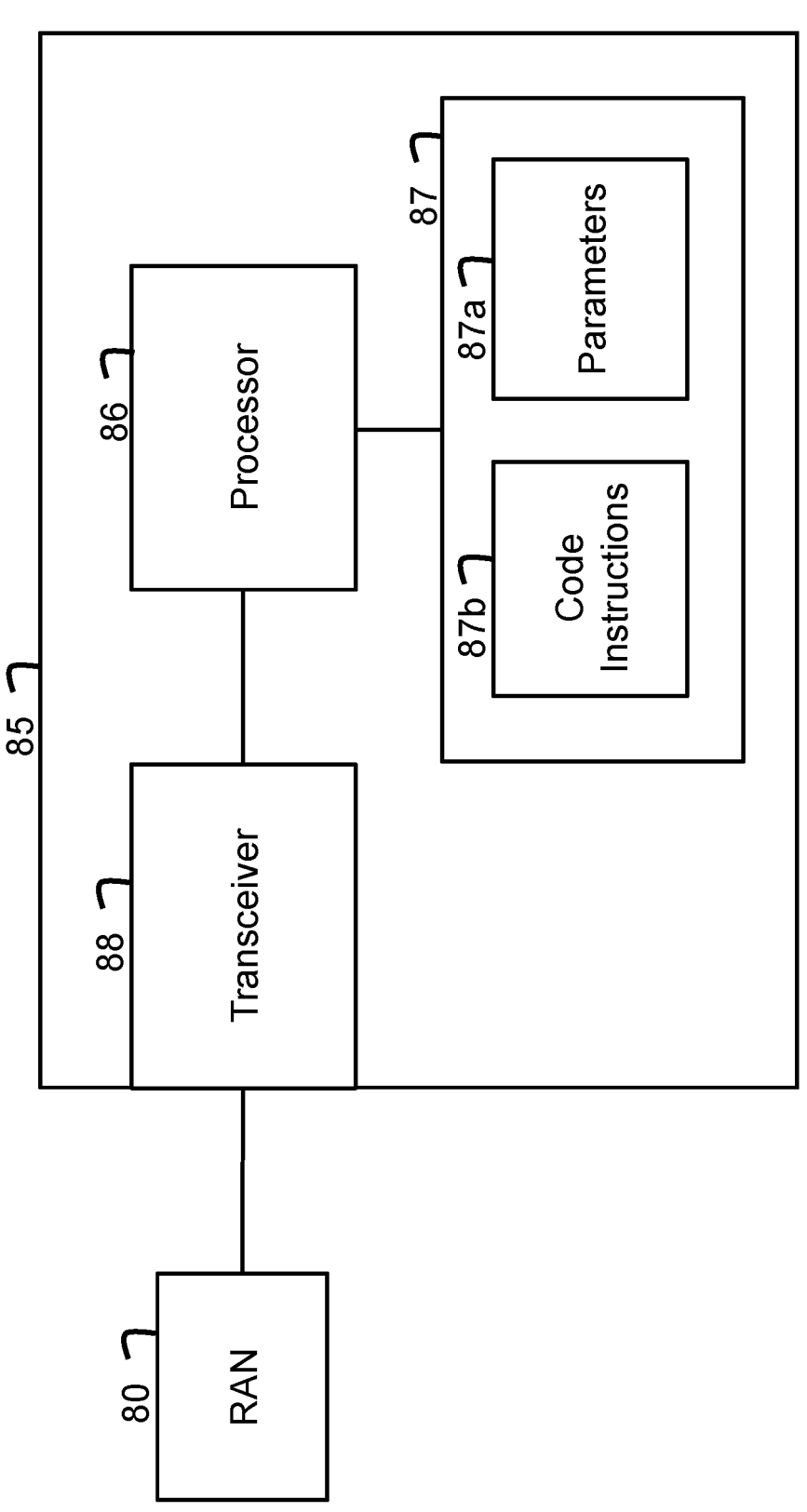
FIG. 12 is a schematic block diagram of a user equipment (UE) according to an embodiment of the present technology.

For example, FIG. 12 is a schematic block diagram of a user equipment (UE) 85 according to an embodiment of the present technology. The UE 85 comprises a processor or a plurality of cooperating processors (represented as a processor 86 for simplicity), a memory device or a plurality of memory devices (represented as a memory device 87 for simplicity), and a transceiver 88 allowing the UE 85 to communicate with the 5G CN 10 via the RAN 80. The processor 86 is operatively connected to the memory device 87 and to the transceiver 88. The memory device 87 includes a storage 87a for storing parameters, including for example and without limitation the above-mentioned permanent and temporary identifiers. The memory device 87 may comprise a non-transitory computer-readable medium 87b for storing instructions that are executable by the processor 87 to allow the UE 85 to perform the various tasks allocated to the UE 85 in the sequences 100 to 300, 500, 600 and 800.

Figure 13:
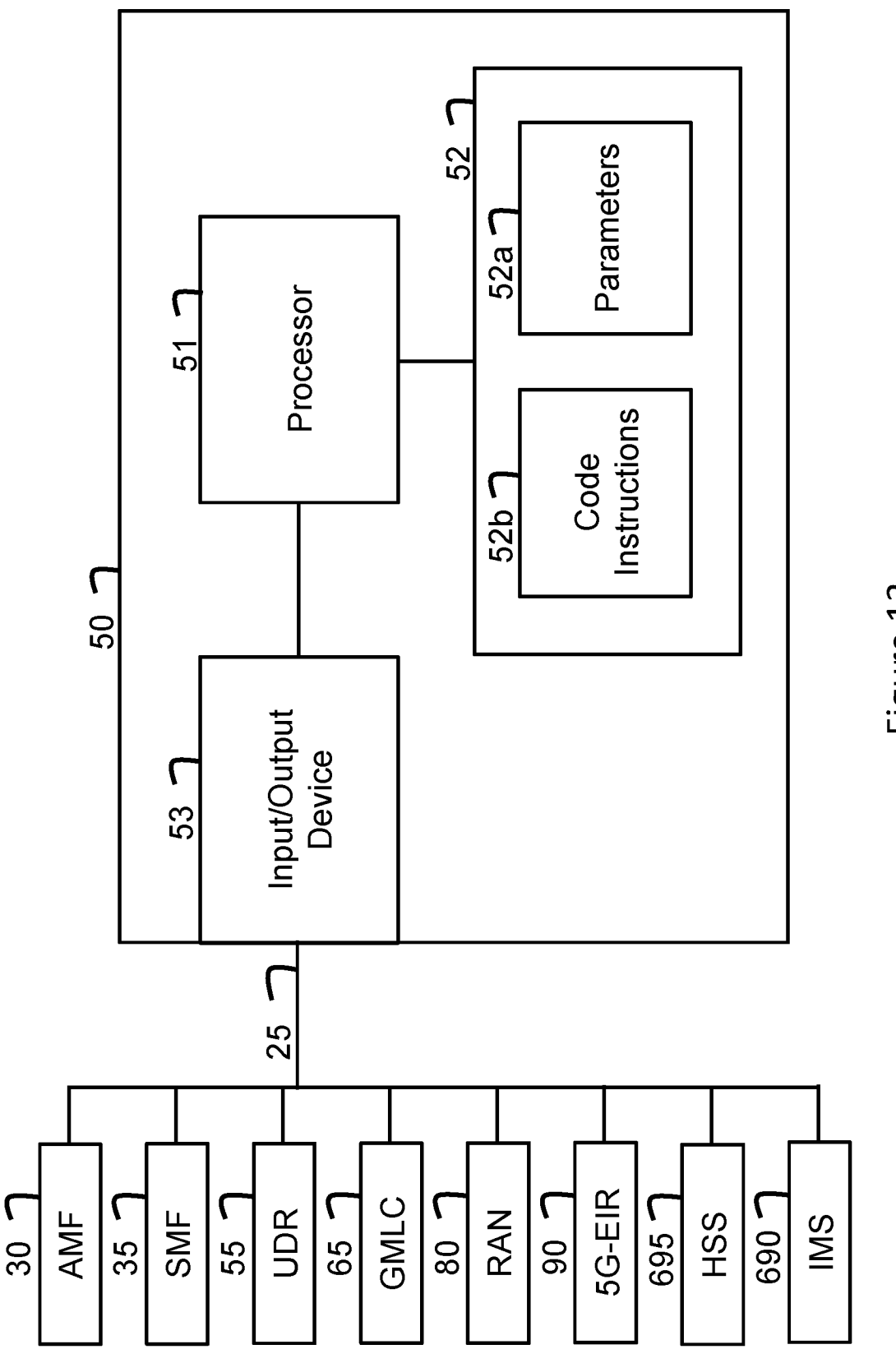
FIG. 13 is a schematic block diagram of a unified data management (UDM) component of the 5G CN according to an embodiment of the present technology.

FIG. 13 is a schematic block diagram of a unified data management (UDM) 50 component of the 5G CN 10 according to an embodiment of the present technology. The UDM 50 comprises a processor or a plurality of cooperating processors (represented as a processor 51 for simplicity), a memory device or a plurality of memory devices (represented as a memory device 52 for simplicity), and an input/output device or a plurality of input/output devices (represented as an input/output device 53 for simplicity). Separate input devices and output devices (not shown) may be present instead of the input/output device 53. The input/output device 53 allows the UDM 55 to communicate with other nodes in the 5G CN 10 via the service based interface 25 and to communicate with the UE 85 via the RAN 80. The processor 51 is operatively connected to the memory device 52 and to the input/output device 53. The memory device 52 includes a storage 52a for storing parameters, including for example and without limitation the above-mentioned permanent and temporary identifiers for a plurality of UEs 85. The memory device 52 may comprise a non-transitory computer-readable medium 52b for storing instructions that are executable by the processor 51 to allow the UDM 50 to perform the various tasks allocated to the UDM 50 in the sequences 100 to 300, 500, 600 and 800.

Figure 14:
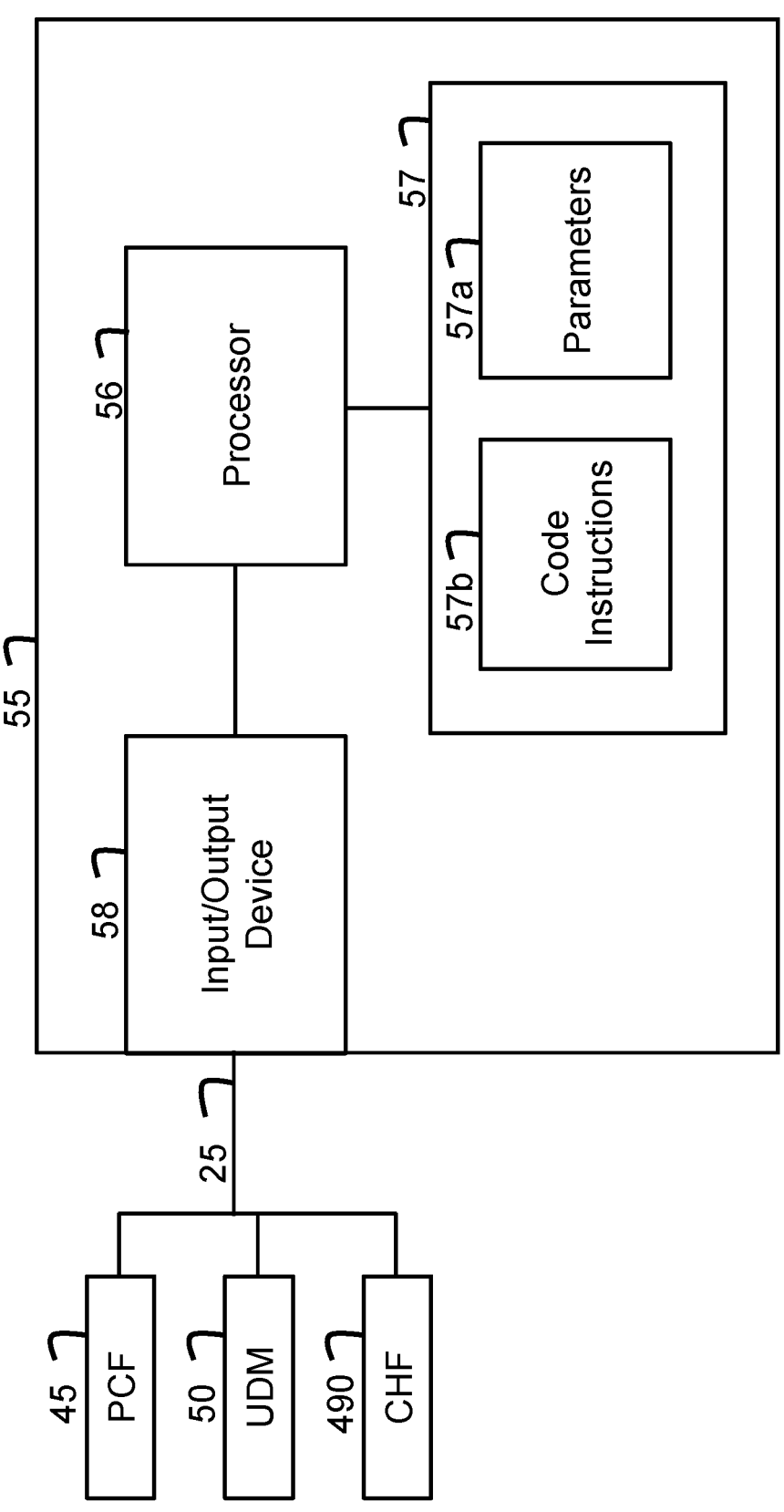
FIG. 14 is a schematic block diagram of a unified data repository (UDR) component of the 5G CN according to an embodiment of the present technology.

FIG. 14 is a schematic block diagram of a unified data repository (UDR) 55 component of the 5G CN 10 according to an embodiment of the present technology. The UDR 55 comprises a processor or a plurality of cooperating processors (represented as a processor 56 for simplicity), a memory device or a plurality of memory devices (represented as a memory device 57 for simplicity), and an input/output device or a plurality of input/output devices (represented as an input/output device 58 for simplicity). Separate input devices and output devices (not shown) may be present instead of the input/output device 58. The input/output device 58 allows the UDM 55 to communicate with other nodes of the 5G CN 10 via the service based interface 25. The processor 56 is operatively connected to the memory device 57 and to the input/output device 58. The memory device 57 includes a storage 57a for storing parameters, including for example and without limitation the above-mentioned permanent and temporary identifiers for a plurality of UEs 85. The memory device 57 may comprise a non-transitory computer-readable medium 57b for storing instructions that are executable by the processor 56 to allow the UDR 55 to perform the various tasks allocated to the UDR 55 in the sequences 300 and 800.

Figure 15:
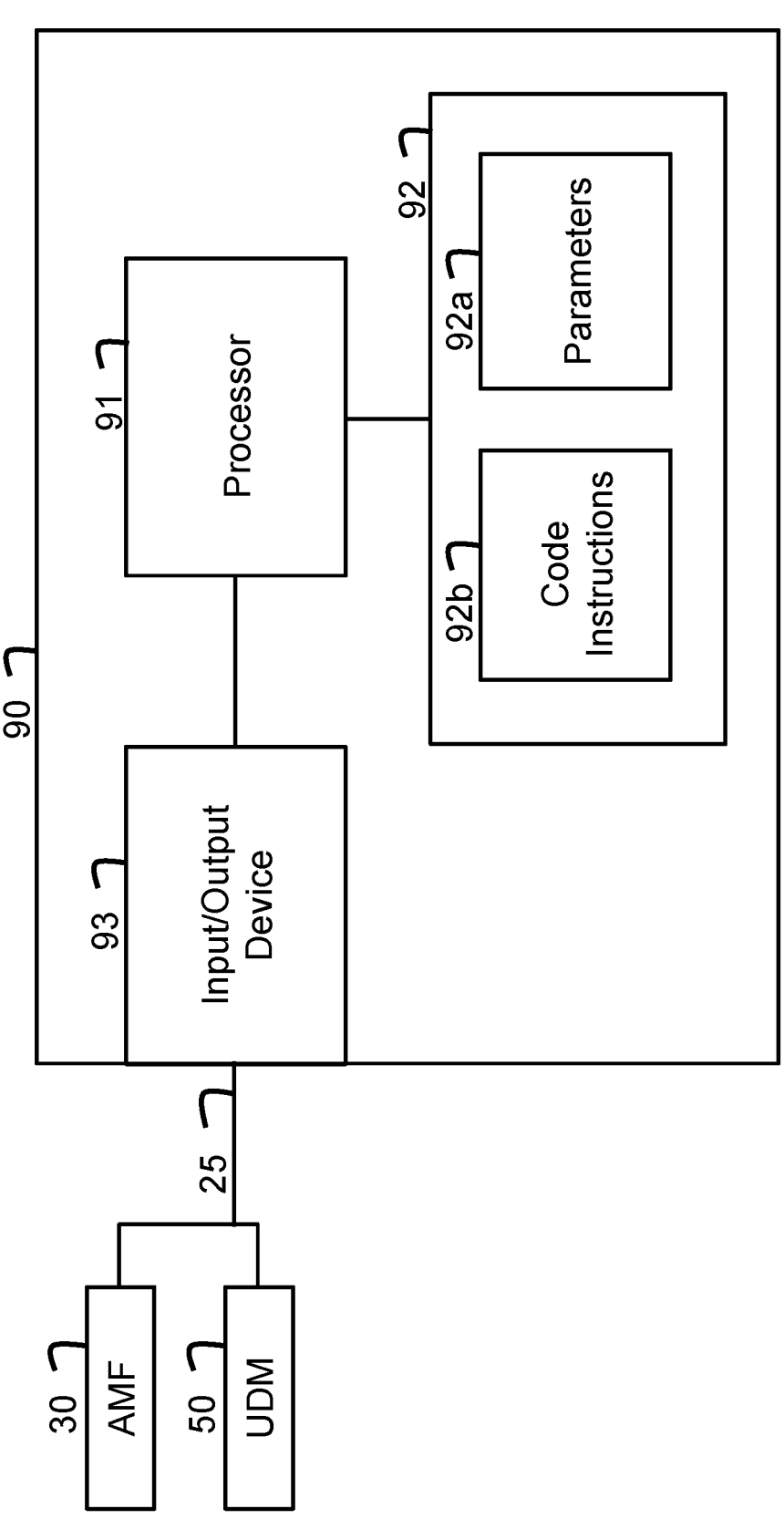
FIG. 15 is a schematic block diagram an equipment identity register (EIR) component of the 5G CN according to an embodiment of the present technology.

FIG. 15 is a schematic block diagram an equipment identity register (EIR) 90 component of the 5G CN 10 according to an embodiment of the present technology. The EIR 90 comprises a processor or a plurality of cooperating processors (represented as a processor 91 for simplicity), a memory device or a plurality of memory devices (represented as a memory device 92 for simplicity), and an input/output device or a plurality of input/output devices (represented as an input/output device 93 for simplicity). Separate input devices and output devices (not shown) may be present instead of the input/output device 93. The input/ output device 93 allows the EIR 90 to communicate with other nodes of the 5G CN 10 via the service based interface 25. The processor 91 is operatively connected to the memory device 92 and to the input/output device 93. The memory device 92 includes a storage 92*a* for storing parameters, including for example and without limitation, the above-mentioned a permanent equipment identifier (PEI) and a pool of temporary permanent identifiers (TPEI) for each a plurality of UEs 85. The memory device 92 may comprise a non-transitory computer-readable medium 92*b* for storing instructions that are executable by the processor 91 to allow the EIR 90 to perform the various tasks allocated to the EIR 90 in the sequences 100 and 300.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A registration method implemented in a user equipment (UE), comprising:
   sending, from the UE, a first registration request toward a trusted node of a core network (CN), the first registration request including a first temporary identifier stored in a memory device of the UE;
   receiving, at the UE, a first registration response from the trusted node, the first registration response including a first random challenge;
   using, at the UE, the first random challenge to generate a second temporary identifier for the UE; and
   overwriting, in the memory device of the UE, the first temporary identifier with the second temporary identifier.

2. The registration method of claim 1, further comprising:
   sending, from the UE, a second registration request toward the trusted node, the second registration request including the second temporary identifier;
   receiving, at the UE, a second registration response from the trusted node, the second registration response including a second random challenge;
   using, at the UE, the second random challenge to generate a third temporary identifier for the UE; and
   overwriting, in the memory device of the UE, the second temporary identifier with the third temporary identifier.

3. The registration method of claim 1, further comprising:
   selecting, at the UE, the first temporary identifier from a pool of temporary identifiers stored in the memory device of the UE before sending the first registration request toward the trusted node the first temporary identifier;
   wherein the first temporary identifier is overwritten with the second temporary identifier within the pool of temporary identifiers.

4. The registration method of claim 1, wherein using, at the UE, the first random challenge to generate a second temporary identifier for the UE comprises:
   inputting, at the UE, the first temporary identifier and an encryption key of the UE into a key derivative function to generate a first intermediate output;

truncating, at the UE, the first intermediate output to a predetermined length to generate a one-time-identifier (OTI) encryption key;
applying, at the UE, the first random challenge and the OTI encryption key to an exclusive OR function to generate a second intermediate output; and
applying, at the UE, the second intermediate output to a reverse optimal asymmetric encryption padding function to generate the second temporary identifier.

5. A user equipment (UE), comprising:
   a transceiver adapted for allowing the UE to communicate with nodes of a core network (CN) over a radio access network (RAN);
   a memory device; and
   a processor operatively connected to the transceiver and to the memory device;
   the memory device comprising a non-transitory computer readable storage medium for storing instructions that are executable by the processor for performing the registration method of claim 1.

6. A registration method implemented in a unified data management (UDM) of a core network (CN), the UDM being identified as a trusted node of the CN, the registration method comprising:
   receiving, at the UDM, a first registration request from a user equipment (UE), the first registration request including a first temporary identifier of the UE; and
   if the UDM determines that the first temporary identifier of the UE is stored in a memory device of the UDM;
      generating, at the UDM, a second temporary identifier of the UE,
      overwriting, in the memory device of the UDM, the first temporary identifier with the second temporary identifier,
      generating, at the UDM, a first random challenge based on the second temporary identifier of the UE, and
      sending, from the UDM toward the UE, a first registration response including the first random challenge.

7. The registration method of claim 6, further comprising rejecting, at the UDM, the registration request if the UDM determines that the first temporary identifier of the UE is not stored in the memory device of the UDM.

8. The registration method of claim 6, further comprising:
   receiving, at the UDM, a second registration request from the UE, the second registration request including a third temporary identifier; and
   if the UDM determines that the third temporary identifier of the UE is stored in the memory device of the UDM;
      generating, at the UDM, a fourth temporary identifier of the UE,
      overwriting, in the memory device of the UDM, the third temporary identifier with the fourth temporary identifier,
      generating, at the UDM, a second random challenge based on the fourth temporary identifier of the UE, and
      sending, from the UDM toward the UE, a second registration response including the fourth random challenge.

9. The registration method of claim 6, wherein:
   the memory device of the UDM stores a pool of temporary identifiers for the UE; and
   the first temporary identifier is overwritten with the second temporary identifier within the pool of temporary identifiers.

10. The registration method of claim 6, wherein the second temporary identifier of the UE is randomly generated at the UDM.

11. The registration method of claim 6, wherein generating, at the UDM, the first random challenge based on the second temporary identifier of the UE comprises:

inputting, at the UDM, the first temporary identifier and an encryption key of the UE into a key derivative function to generate a first intermediate output;

truncating, at the UDM, the first intermediate output to a predetermined length to generate a one-time-identifier (OTI) encryption key;

applying, at the UDM, the second temporary identifier to an optimal asymmetric encryption padding function to generate a second intermediate output;

applying, at the UDM, the OTI encryption key and the second intermediate output to an exclusive OR function to generate the first random challenge.

12. The registration method of claim 6, further comprising, after sending the first registration response from the UDM toward the UE, receiving, from the UE at the UDM, a registration complete message including a field acknowledging receipt of the second temporary identifier.

13. The registration method of claim 6, further comprising:

receiving, from another trusted node of the CN, a request for providing location information of the UE; and responding, from the UDM to the other trusted node of the CN, by providing a network address of an untrusted node of the CN that is currently serving the UE.

14. The registration method of claim 6, further comprising:

receiving, at the UDM from another trusted node of the CN, a request for resolving a temporary generic public subscription identifier (GPSI) of the UE;

responding, from the UDM to the other trusted node of the CN, with a GPSI of the UE;

receiving, at the UDM from the other trusted node of the CN, a request for resolving a GPSI of a party called by the UE; and responding, from the UDM to the other trusted node of the CN, with a temporary GPSI of the party called by the UE.

15. The registration method of claim 6, further comprising:

receiving, at the UDM from a first untrusted node of the CN, a first request to register the untrusted node of the CN as a serving node for the UE, the first request including the first temporary identifier of the UE;

receiving, at the UDM from the first untrusted node of the CN, a second request for fetching user data for the UE, the second request including the first temporary identifier of the UE;

sending the user data for the UE from the UDM to the untrusted node of the CN; and sending, from the UDM to the untrusted node of the CN, a deregistration message including a previous temporary identifier of the UE.

16. A unified data management (UDM), comprising:

an input/output device adapted for allowing the UDM to communicate with nodes of a core network (CN) and with a user equipment (UE);

a memory device; and a processor operatively connected to the transceiver and to the memory device;

the memory device comprising a non-transitory computer readable storage medium for storing instructions that are executable by the processor for performing the registration method of claim 6.

17. A registration method implemented in an equipment identity register (EIR) of a core network (CN), the EIR being identified as a partially trusted node of the CN, the registration method comprising:

receiving, at the EIR from an access and mobility management function (AMF), an equipment identity verification request including a temporary equipment identifier (TPEI) for a user equipment (UE);

selectively forwarding the received TPEI from the EIR to a unified data management (UDM);

receiving, at the EIR from the UDM, a new TPEI; and forwarding the new TPEI from the EIR to the AMF.

18. The method of claim 17, further comprising storing, at the EIR, the new TPEI in a pool of TPEIs for the UE.

19. The method of claim 17, further comprising verifying, at the EIR, that the received TPEI is not blacklisted before forwarding the received TPEI from the EIR to the UDM.

20. An equipment identity register (EIR), comprising:

an input/output device adapted for allowing the EIR to communicate with nodes of a core network (CN);

a memory device; and a processor operatively connected to the transceiver and to the memory device;

the memory device comprising a non-transitory computer readable storage medium for storing instructions that are executable by the processor for performing the registration method of claim 17.

* * * * *